United States Patent
Kashima et al.

[19]

[11] Patent Number: 6,094,300
[45] Date of Patent: Jul. 25, 2000

[54] LASER SCANNING MICROSCOPE

[75] Inventors: Shingo Kashima, Sagamihara; Yosuke Kishi, Yokohama, both of Japan

[73] Assignee: Olympus Optical Co., Ltd., Tokyo, Japan

[21] Appl. No.: 08/972,591

[22] Filed: Nov. 18, 1997

[30] Foreign Application Priority Data

Nov. 21, 1996 [JP] Japan ...................................... 8-310889
Oct. 27, 1997 [JP] Japan ...................................... 9-294107

[51] Int. Cl.[7] ........................... G02B 21/06; G02B 21/00; G02B 26/08; G01J 3/30
[52] U.S. Cl. .......................... 359/385; 359/368; 359/389; 359/204; 356/317; 356/318
[58] Field of Search ...................... 359/368, 385, 359/389, 201, 204; 356/317, 318, 417, 73

[56] References Cited

U.S. PATENT DOCUMENTS

| | | | |
|---|---|---|---|
| 3,728,018 | 4/1973 | Wharton et al. | 355/46 |
| 4,498,766 | 2/1985 | Unterleitner | 356/73 |
| 4,734,578 | 3/1988 | Horikawa | 356/444 |
| 5,034,613 | 7/1991 | Denk et al. | 356/318 |
| 5,225,923 | 7/1993 | Montagu | 359/368 |
| 5,386,112 | 1/1995 | Dixon | 359/368 |
| 5,880,880 | 3/1999 | Anderson et al. | 359/385 |

FOREIGN PATENT DOCUMENTS 6-160724  6/1994  Japan .

OTHER PUBLICATIONS

W. Denk et al; Two–Photon Laser Scanning Fluorescence Microscopy; Apr. 6, 1990; pp. 73–76; Science vol. 248.

Primary Examiner—Cassandra Spyrou
Assistant Examiner—Jennifer Winstedt
Attorney, Agent, or Firm—Frishauf, Holtz, Goodman, Langer & Chick, P.C.

[57] ABSTRACT

A laser scanning microscope having a first scanning optical system that causes coherent light projected from a first laser light source to scan a specimen, and a second scanning optical system that projects coherent light output from a second laser light source at a given position on the specimen. Fluorescence from the specimen is measured by a photoelectric conversion element.

22 Claims, 14 Drawing Sheets

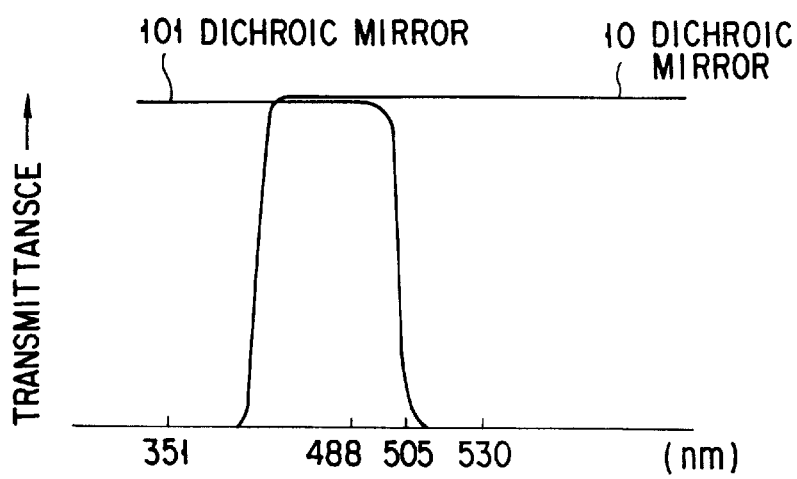
F I G. 3
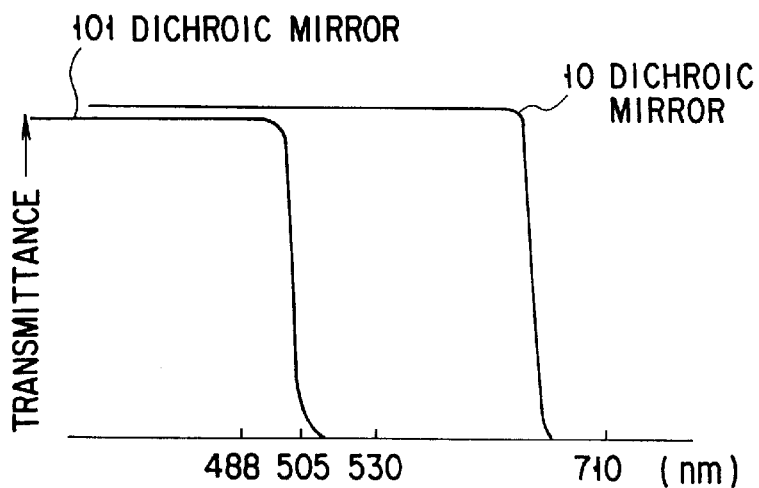
F I G. 4
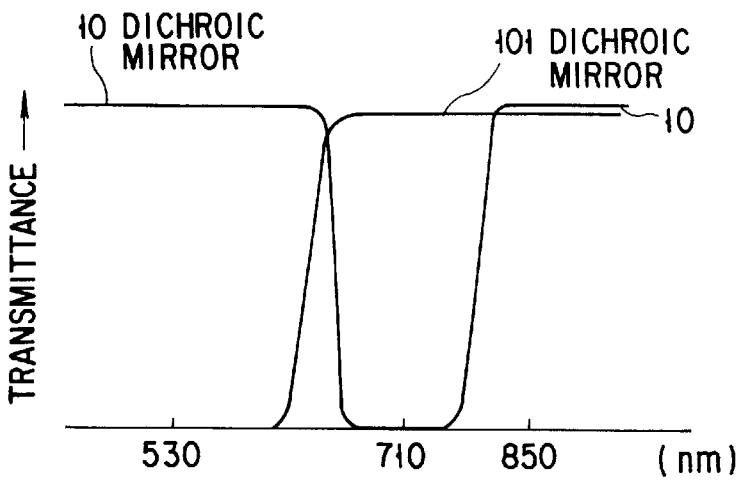
F I G. 5

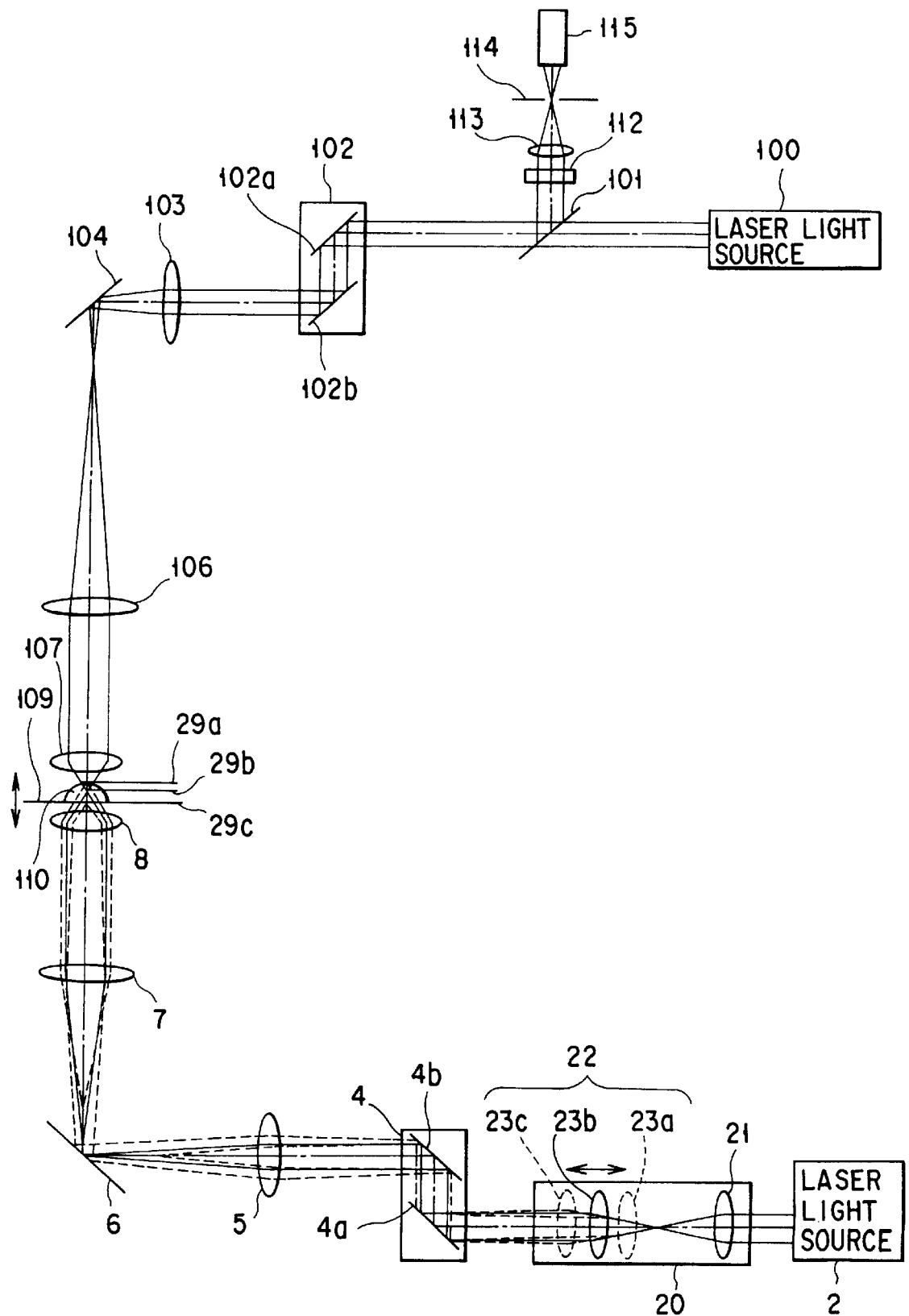
F I G. 15

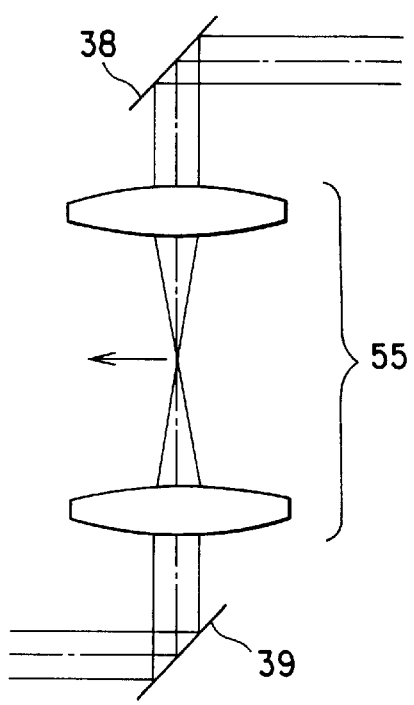 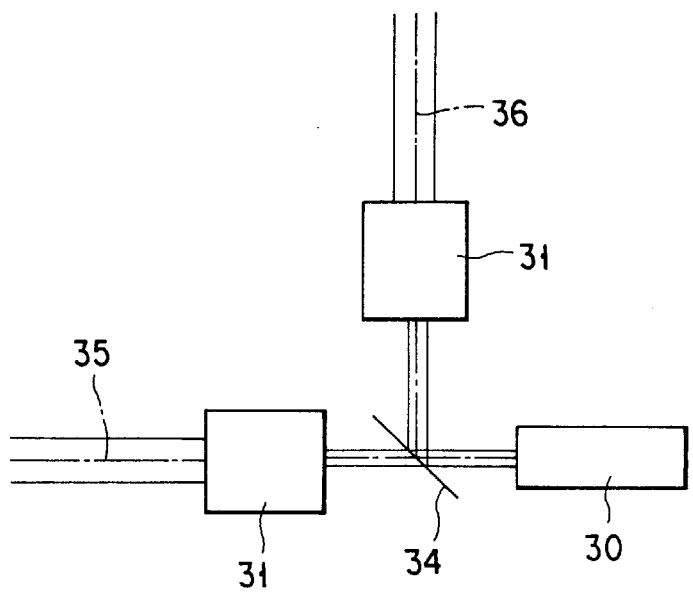
F I G. 17   F I G. 18

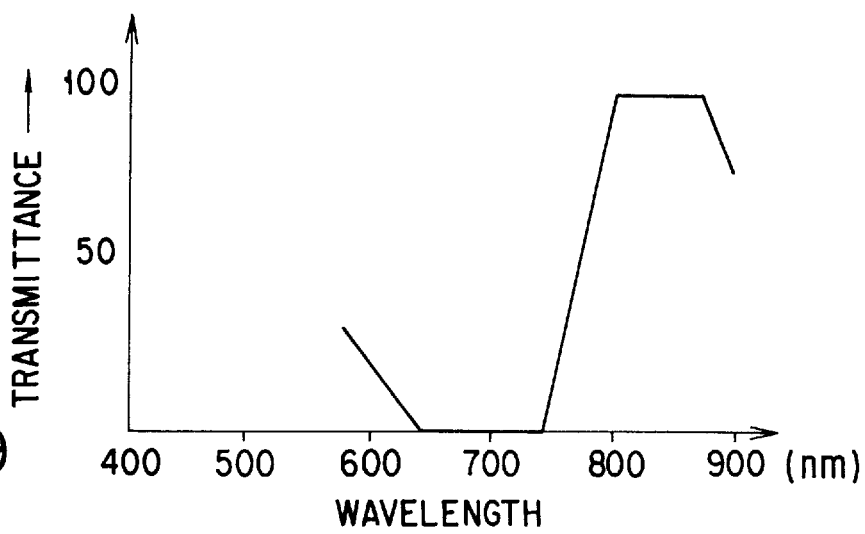
F I G. 19
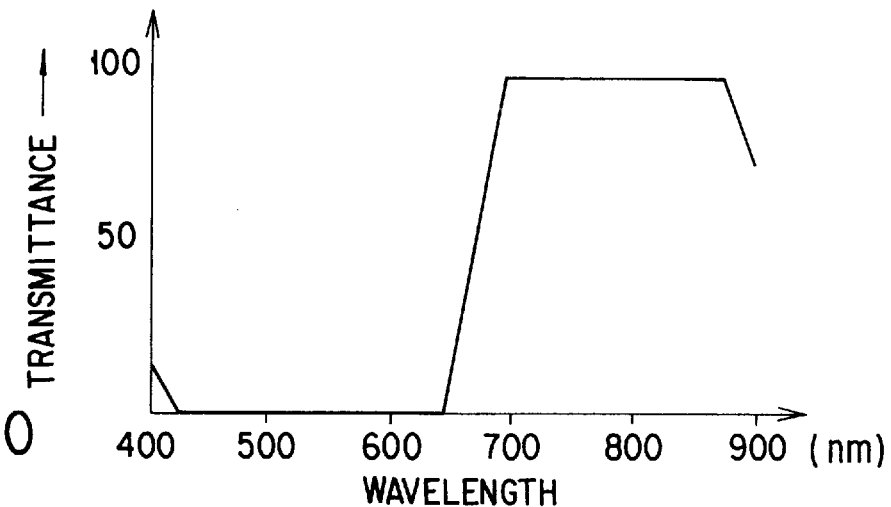
F I G. 20
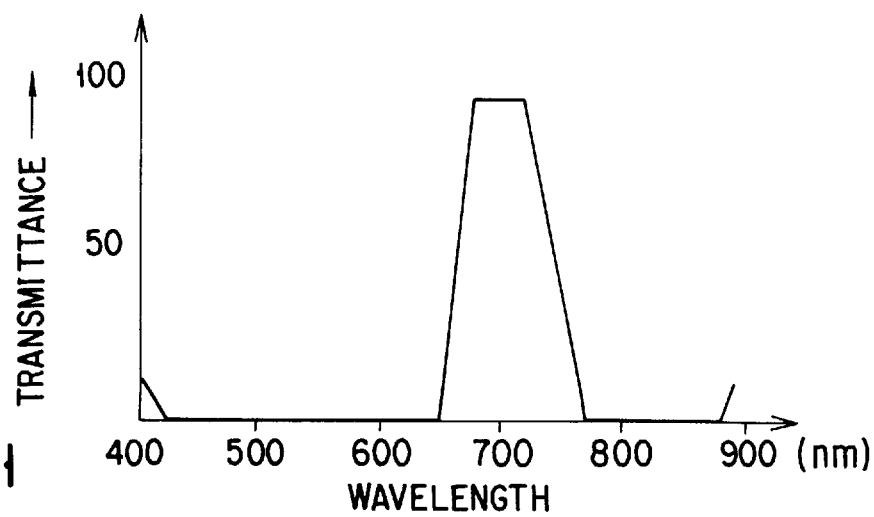
F I G. 21

LASER SCANNING MICROSCOPE

BACKGROUND OF THE INVENTION

This invention relates to a laser scanning microscope that senses the transmitted light or reflected light from a specimen or fluorescence from a specimen while scanning the specimen by means of the coherent light emitted from a laser light source.

FIG. 23 shows the configuration of a scanning-type laser microscope.

The scanning-type laser microscope comprises a laser light source 100 that outputs coherent light, a scanning optical unit 102 that causes a bundle of rays from the laser light source to scan the image plane of an objective 107, and the objective 107 that gathers the bundle of rays of light on the image plane.

The operation of the scanning-type laser microscope will be explained.

The coherent light (laser light) from the laser light source 100 passes through a dichroic mirror 101 and enters the scanning optical unit 102.

The scanning optical unit 102 includes scanning mirrors 102a, 102b that scan at right angles with each other. The scanning optical unit 102 deflects the incident coherent light in the direction of X and the direction Y by means of the scanning mirrors 102a, 102b.

After the deflected coherent light has passed through a relay lens 103, the direction of its optical path is changed by a mirror 104. Then, the coherent light passes through a dichroic mirror 105 and is caused by an image formation lens 106 to meet the pupil diameter of an objective 107.

Specifically, the coherent light passed through the image formation lens 106 reaches a dichroic mirror 108 and an objective 107. The coherent light further passes through the objective 107 and is gathered on the cross section 111 of a specimen 110 placed on a stage 109.

When the coherent light is projected on the specimen 110 this way, the light excites a fluorescent indicator, which then generates fluorescence. For example, when the calcium ion indicator fluo-3 is used as a fluorescent indicator and a laser wavelength of 488 nm (e.g., argon laser) is used, fluo-3 will generate light with a fluorescence wavelength of 530 nm.

The fluorescence from the specimen 110 travels backward on the optical path. Specifically, the fluorescence from the specimen 110 passes through the objective 107, dichroic mirror 108, image formation lens 106, dichroic mirror 105, mirror 104, relay lens 103, and individual scanning mirrors 102b, 102a and reaches the dichroic mirror 101. The dichroic mirror 101 reflects the light, which then enters a photometric filter 112.

The photometric filter 112 permits only the fluorescence wavelength from the specimen 110 to pass through. The light is caused by the lens 113 to form an image in the plane of a pin hole 114. The photometric filter allows a specific wavelength band to pass through. The fluorescence passed through the pin hole 114 is measured by a photoelectric conversion element 115.

The characteristic of the dichroic mirror 101 is determined by the excitation wavelength (laser wavelength) of a fluorescent pigment that dyes the specimen 110 and the fluorescence wavelength. For example, when the calcium ion indicator fluo-3 is used as a fluorescent indicator and a laser wavelength of 488 nm (e.g., argon laser) is used, fluo-3 will generate light with a fluorescence wavelength of 530 nm as described above. This will cause the dichroic mirror 101 to reflect rays of-light with a wavelength of 505 nm or more.

In the observation of the specimen 110, the coherent light is deflected in the direction of X and the direction of Y by the scanning mirrors 102a, 102b in the scanning optical unit 102, passes through the objective 107, and illuminates the specimen 110. This makes it possible to continuously measure the fluorescence in the image formation position on the cross section 111 of the specimen 110 and form an image of the specimen in the scanning range.

The raising and lowering of the stage 109 or objective 107 produces a cross-sectional image different from the cross section 111 of the specimen 110, which makes it possible to form a three-dimensional image of the specimen.

When an UV (ultraviolet rays) pulse laser is used as the laser light source 100 and the scanning mirrors 102a, 102b in the scanning optical unit 102 are stopped in given directions, the UV pulse laser light can be projected on the desired position on the specimen 110.

For instance, when a caged indicator is used, the projection of the UV pulse laser causes the substance enclosed by the caged compounds to be emitted, which induces a peculiar phenomenon in a particular region of the cell.

The entire illumination of the specimen 110 is carried out by an illumination optical system composed of a light source 116, a lens 117, an excitation filter 118, and a dichroic mirror 108. The fluorescence emitted from the specimen 110 is reflected by the dichroic mirror 105. A photometric filter 119 extracts the fluorescence wavelength. Then, a photographing element 120, such as a CCD camera, receives the fluorescence wavelength extracted by the photometric filter 119 and produces an image of the fluorescence.

As described above, when laser light (i.e., UV pulse laser) is projected momentarily at the desired position on the specimen 110 and the dynamic characteristic of the specimen 110 resulting from the effect of the projection of the laser light is determined, a chronological record of the specimen images is needed. To meet the need, a method of acquiring images by use of a CCD camera is generally used.

The method of acquiring images with a CCD camera, however, produces no confocal image. The acquired image has a focal depth greater than that of a confocal image. As a result, it is not known at what depth a peculiar phenomenon resulting from the release of the caged radicals has been developing.

Therefore, it is desirable to determine the dynamic characteristic of the specimen 110 by momentarily projecting laser light at the desired position on the specimen 110 while observing and recording the image of the specimen with a confocal laser microscope.

Depending on uses for research work, the region on which laser light is projected and the cross section the researcher wants to observe are not necessarily in the same plane. There may be a case where the researcher wants to project laser light on part of a cross section and get an image of a different cross section.

For instance, when stimulation is given to the sympathetic nerve outside an artery, it is determined what response has occurred in the smooth muscle or endothelial cells inside the artery.

In such a case, it is desirable that the region on which laser light is projected and the cross section whose image is to be acquired should be selected within the specimen 110.

BRIEF SUMMARY OF THE INVENTION

An object of the present invention is to provide a laser scanning microscope capable of determining the dynamic characteristic of a specimen by projecting laser light at a desired position on the specimen while observing and recording an image of the specimen.

Another object of the present invention is to provide a laser scanning microscope capable of selecting within a specimen a region on which laser is to be projected and a cross section whose image is to be acquired.

According to a first aspect of the present invention, there is provided a laser scanning microscope comprising: at least one laser light source that outputs coherent light; a plurality of scanning optical systems that cause rays of the coherent light outputted from the laser light source to scan a specimen separately; and a sense optical system that senses the transmitted light produced by the coherent light passing through the specimen, the reflected light produced by the coherent light being reflected by the specimen, or the fluorescence generated at the specimen when at least one of those scanning optical systems is causing the coherent light to scan the specimen.

The laser scanning microscope of the first aspect of the present invention may further comprise: an optical element that causes the optical axis of each of the rays of the coherent light forced to scan by the plurality of scanning optical systems to coincide with each other; and an objective that is placed on the optical axis caused to coincide with each other by the optical element and that gathers the rays of the coherent light at the same position on the specimen.

The laser scanning microscope of the first aspect of the present invention may further comprise: control means for providing scanning control of each of the plurality of scanning optical systems.

The laser scanning microscope of the first aspect of the present invention may further comprise: image processing means that forms images from each ray of the transmitted light, each ray of the reflected light sensed by the sense optical system for each of the scanning optical systems, and each ray of the fluorescence and superimposes the images on at least the same image, when the plurality of scanning optical systems cause the coherent light to scan the specimen.

The laser scanning microscope of the first aspect of the present invention may further comprise: an optical adjustment mechanism that shifts along the optical axis of the coherent light the light convergence position on the specimen of at least one of the rays of the coherent light projected on the specimen by the scanning of the plurality of scanning optical systems.

The laser scanning microscope of the first aspect of the present invention may further comprise: a position check optical system that projects position check light on the specimen, wherein the position on the specimen at which light is projected coincides with the light convergence position on the specimen of the coherent light projected on the specimen by the scanning of at least one of the plurality of scanning optical system.

According to a second aspect of the present invention, there is provided a laser scanning microscope comprising: a first laser light source that outputs coherent light; a first scanning optical system for observation that causes the coherent light outputted from the first laser light source to scan one side of a specimen; a second laser light source that outputs coherent light; a second scanning optical system that causes the coherent light outputted from the second laser light source to scan a given region on the other side of the specimen opposite to the one side; and a sense optical system that senses the fluorescence generated at the specimen when the first scanning optical system causes the coherent light to scan the specimen and that senses the transmitted light or fluorescence from the specimen when the second scanning optical system projects the coherent light on a given region of the specimen According to a third aspect of the present invention, there is provided a laser scanning microscope comprising: a first laser light source that outputs coherent light; a first scanning optical system for observation that causes the coherent light outputted from the first laser light source to scan a specimen; a second laser light source that outputs coherent light; a second scanning optical system that causes the coherent light outputted from the second laser light source to scan a given region of the specimen; a dichroic mirror that causes the optical axis of the coherent light from the first scanning optical system to coincide with that of the coherent light from the second scanning optical system; an objective that is placed on the optical axis caused to coincide with each other by the dichroic mirror and that gathers the rays of the coherent light forced to scan by the first and second scanning optical systems, on the same cross section of the specimen; and a sense optical system that senses the fluorescence generated at the specimen when the first scanning optical system causes the coherent light to scan the specimen and that senses the transmitted light or reflected light from the specimen when the second scanning optical system projects the coherent light on a given region of the specimen.

In the laser scanning microscope of each of the second and third aspects of the present invention, the specimen may be dyed with fluorescence pigment, the first laser light source may output coherent light including a wavelength that excites the fluorescence pigment to generate fluorescence, and the scanning optical system may project the coherent light from the second laser light source on a given region of the specimen to cause the specimen to react.

In the laser scanning microscope of the third aspect of the present invention, the first laser light source may output visible continuos laser light or IR pulse laser light, and the second laser light source may output ultraviolet pulse laser light or IR pulse laser light.

In the laser scanning microscope of the third aspect of the present invention, the IR pulse laser light may be projected on the fluorescence pigment with which the specimen has been dyed, to induce two-photon absorption.

In the laser scanning microscope of the second and third aspects of the present invention, the specimen may be a workpiece, the first laser light source may output coherent light for observing the workpiece, and the second laser light source may output high-power coherent light for machining the workpiece.

In the laser scanning microscope of the second and third aspects of the present invention, the first and second scanning optical systems may each have a scanning mirror that scans in a direction perpendicular to each other and deflect the coherent light in a direction perpendicular to each other.

The laser scanning microscope of the second and third aspects of the present invention may further comprise: control means for providing scanning control of the first and second scanning optical systems, image processing means that superimposes images on at least the same image or arranges images, the images being obtained when the first and second scanning optical systems each cause the coherent light to scan the specimen, and a monitor television for displaying the result of the image processing from the image processing means.

The laser scanning microscope of the second and third aspects of the present invention may further comprise an optical adjustment mechanism that shifts along the optical axis of the coherent light the light convergence position on the specimen of the coherent light projected on the specimen by the scanning of the second scanning optical system.

In the laser scanning microscope of the first to third aspects of the present invention, the optical adjustment mechanism may include: a fixed lens for gathering the coherent light; and a movable lens that is placed so as to move freely along the optical axis of the coherent light and that receives the coherent light gathered by the fixed lens and emits the coherent light at a given emission angle.

The laser scanning microscope of the second and third aspects of the present invention may further comprise: a light source for outputting position check light; and a mirror that directs the light from the light source onto the optical axis of the coherent light in the second scanning optical system and projects the position check light at the same position as the position at which the coherent light is projected on the specimen by the scanning the second scanning optical system.

In the laser scanning microscope of the second and third aspect of the present invention, the position check light source may output laser light with a wavelength that has no effect on the specimen.

According to a fourth aspect of the present invention, there is provided a laser scanning microscope comprising: a laser light source for outputting sub-picosecond monochromatic coherent light pulses with a wavelength in the near infrared range; an objective system for gathering the monochromatic coherent light pulses from the laser light source on a specimen; at least one bundle-of-rays conversion optical system for collimating the bundle of rays of monochromatic coherent light pulses outputted from the laser light source to the desired size; optical-path branching means for branching the optical path of the monochromatic coherent light pulses from the bundle-of-rays conversion optical system into two optical paths or switching the optical path; a first scanning optical system that is placed on a first branch optical path via the optical-path branching means and that gathers the monochromatic coherent light pulses on the image surface in the objective system and causes them to scan the image surface; a sense optical system for sensing fluorescence generated at the specimen being excited by a light convergence spot of the gathered monochromatic coherent light; a second scanning optical system that is placed on a second branch optical path via the optical-path branching means and that gathers the monochromatic coherent light pulses on the image surface in the objective system and causes them to scan the image surface; and optical-path coupling means for introducing the light convergence spot into the objective system, wherein the objective system is shared by the first and second optical paths.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 shows a transmittance-wavelength characteristic as an example of a spectral characteristic of a dichroic mirror applied to the microscope;

FIG. 4 shows a transmittance-wavelength characteristic as an example of a spectral characteristic of a dichroic mirror applied to the microscope;

FIG. 5 shows a transmittance-wavelength characteristic as an example of a spectral characteristic of a dichroic mirror applied to the microscope;

FIG. 15 shows the configuration of a laser scanning microscope according to a sixth embodiment of the present invention;

FIG. 17 shows a partial configuration of a replaceable optical system in the microscope;

FIG. 18 shows a partial configuration of another replaceable optical system in the microscope;

FIG. 19 shows the relationship between the wavelength and transmittance as an example of the spectral characteristic of the dichroic mirror;

FIG. 20 shows a transmittance-wavelength characteristic as an example of a spectral characteristic of the dichroic mirror;

FIG. 21 shows a transmittance-wavelength characteristic as an example of a spectral characteristic of the dichroic mirror;

DETAILED DESCRIPTION OF THE INVENTION (1) Hereinafter, referring to the accompanying drawings, a first embodiment of the present invention will be explained. The same parts as those in FIG. 23 are indicated by the same reference symbols and a detailed explanation of them will not be given.

FIG. 1 shows the configuration of a laser scanning microscope.

Figure 1:
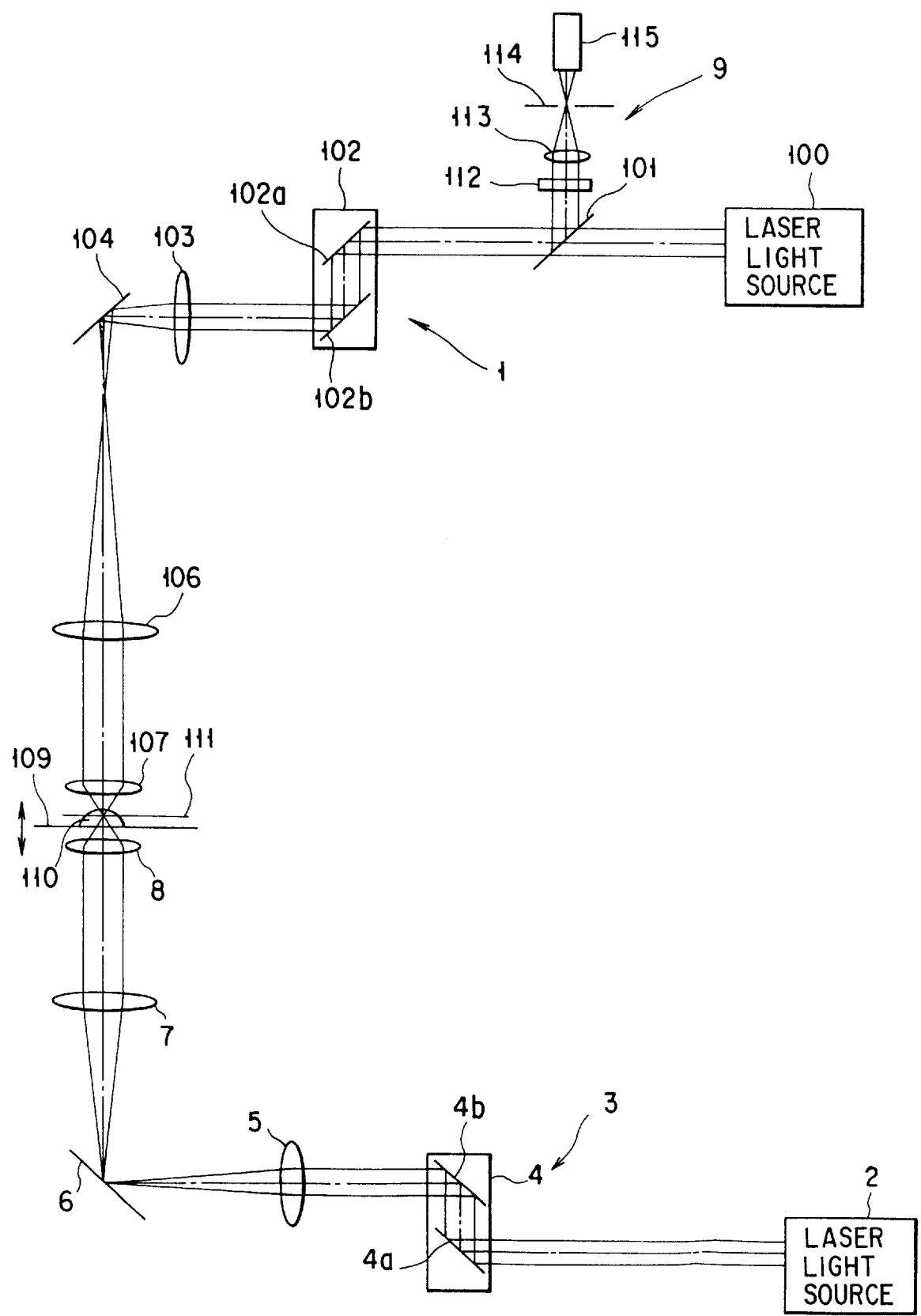
FIG. 1 shows the configuration of a laser scanning microscope according to a first embodiment of the present invention.

The laser scanning microscope comprises a first scanning optical system 1 for observation that scans a specimen 110 with the coherent light outputted from a first laser light source 100 and a second scanning optical system 3 that projects the coherent light from a second laser light source 2 onto a given region of the specimen 110 to cancel the caged state (or to cause the specimen 110 to react chemically).

The first scanning optical system 1 for observation 1 comprises a dichroic mirror 101, a scanning optical unit 102, a relay lens 103, a mirror 104, an image formation lens 106, and an objective 107, all of which are arranged on the optical axis of the coherent light outputted from the first laser light source 100.

The second scanning optical system 3 comprises a scanning optical unit 4, a relay lens 5, a mirror 6, an image formation lens 7, and an objective 8, all of which are arranged on the optical axis of the coherent light outputted from the second laser light source 2. The scanning optical unit 4 includes scanning mirrors 4a, 4b that each scan in a direction perpendicular to each other.

On a branch optical path of the dichroic mirror 101, a sense optical system 9 is provided. The sense optical system 9 has the function of sensing fluorescence generated at the specimen 110 when the first scanning optical system 1 scans the specimen 110 with coherent light and the function of sensing the transmitted light or fluorescence from the specimen 110 when the second scanning optical system 3 scans the specimen 110 with coherent light.

The sense optical system 9 comprises a photometric filter 112, a lens 113, a pin hole 114, and a photoelectric conversion element 115, all of which are arranged on the branch optical path of the dichroic mirror 101.

The characteristic of the dichroic mirror 101 is determined by the excitation wavelength (laser wavelength) of a fluorescent pigment that dyes the specimen 110 and the fluorescence wavelength. For example, when the calcium ion indicator fluo-3 is used as a fluorescent indicator and a laser wavelength of 488 nm (e.g., argon laser) is used, fluo-3 will generate light with a fluorescence wavelength of 530 nm as described above. This will cause the dichroic mirror 101 to reflect rays of light with wavelengths of, for example, 505 nm or more.

Use of an IR pulse laser as the first laser light source 100 produces an image by two-photon absorption. At this time, since two-photon absorption takes place only in the image formation position, the pin hole 114 is not needed theoretically. The dichroic mirror 101 has a short-wavelength reflection characteristic to permit IR laser to pass through and reflect visible fluorescence, thereby directing the fluorescence to the photoelectric conversion element 115.

The operation of the laser scanning microscope constructed as described above will be explained.

In the embodiment, the second scanning optical system 3 is used to project coherent light onto a given position on the specimen 110.

The coherent light emitted from the second laser light source 2 enters the scanning optical unit 4. The scanning optical unit 4 causes the scanning mirrors 4a, 4b to deflect the coherent light arbitrarily.

After the deflected coherent light has passed through the relay lens 5, its optical path is changed by the mirror 6. Then, the coherent light passes through the image formation lens 7 and is directed to the objective 8.

The light passed through the objective 8 is gathered on the cross section 111 of the specimen 110 on the stage 109.

Depending on uses, the scanning mirrors 4a, 4b may be caused to scan a particular range, or be stopped to spotlight the specimen. Furthermore, the scanning mirrors 4a, 4b may be caused to skip momentarily to spotlight a plurality of given positions momentarily.

The coherent light emitted from the first laser light source 100 passes through the dichroic mirror 101 and enters the scanning optical unit 102.

The scanning optical unit 102 deflects the coherent light in the direction of X and the direction of Y by means of the scanning mirrors 102a, 102b.

After the deflected coherent light has passed through the relay lens 103, the direction of its optical path is changed by the mirror 104. Then, the coherent light is caused by the image formation lens 106 to meet the pupil diameter of the objective 107.

Specifically, the light passed through the image formation lens 106 reaches the objective 107. The light passed through the objective 107 is gathered on the cross section 111 of the specimen 110 on the stage 109.

When the light is projected on the specimen 110 this way, the light excites a fluorescent indicator, which then generates fluorescence. For example, when the calcium ion indicator fluo-3 is used as the fluorescent indicator and a laser wavelength of 488 nm (e.g., argon laser) is used, fluo-3 generates light with a fluorescence wavelength of 530 nm.

The fluorescence from the specimen 110 travels backward on the optical path. Specifically, the fluorescence from the specimen 110 passes through the objective 107, image formation lens 106, mirror 104, relay lens 103, and individual scanning mirrors 102b, 102a and reaches the dichroic mirror 101. The dichroic mirror 101 reflects the light, which then enters the photometric filter 112.

The dichroic mirror 101 depends on the excitation wavelength of a fluorescent pigment that dyes the specimen 110 and the fluorescence wavelength.

The photometric filter 112 permits only the fluorescence wavelength from the specimen 110 to pass through. The light is caused by the lens 113 to form an image in the plane of the pin hole 114. The fluorescence passed through the pin hole 114 is measured by the photoelectric conversion element 115.

As described above, with the first embodiment, independently of the first scanning optical system 1, the second scanning optical system 3 projects the coherent light emitted from the second laser light source 2 onto a given position on the specimen 110 and the first scanning optical system 1 scans the specimen 110 with the coherent light emitted from the first laser light source 100. The fluorescence from the specimen is measured by the photoelectric conversion element 115. As a result, when the second scanning optical system 3 projects coherent light on the specimen 110 in the middle of observing or recording an image of the specimen with the first scanning optical system, it is possible to examine the dynamic characteristic (chemical reaction) of the specimen 110 induced by the projection of coherent light by the second scanning optical system 3.

It is possible to provide the objective 8 with the function of shifting, along the optical axis of the coherent light, the position at which the coherent light is projected on the specimen 110. There may be a case where the region of the specimen 110 on which laser light is projected and the cross section to be observed are not necessarily in the same plane. More specifically, there may be a case where although projecting laser light on part of a cross section, the researcher wants to get an image of a different cross section. For instance, after stimulation has been given to the sympathetic nerve outside an artery, it is determined what response has occurred in the smooth muscle or endothelial cells inside the artery. This can be realized, provided that the objective 8 can shift along the optical axis.

(2) Hereinafter, a second embodiment of the present invention will be explained. The same parts as those in FIG. 1 are indicated by the same reference symbols and a detailed explanation of them will not be given.

Figure 2:
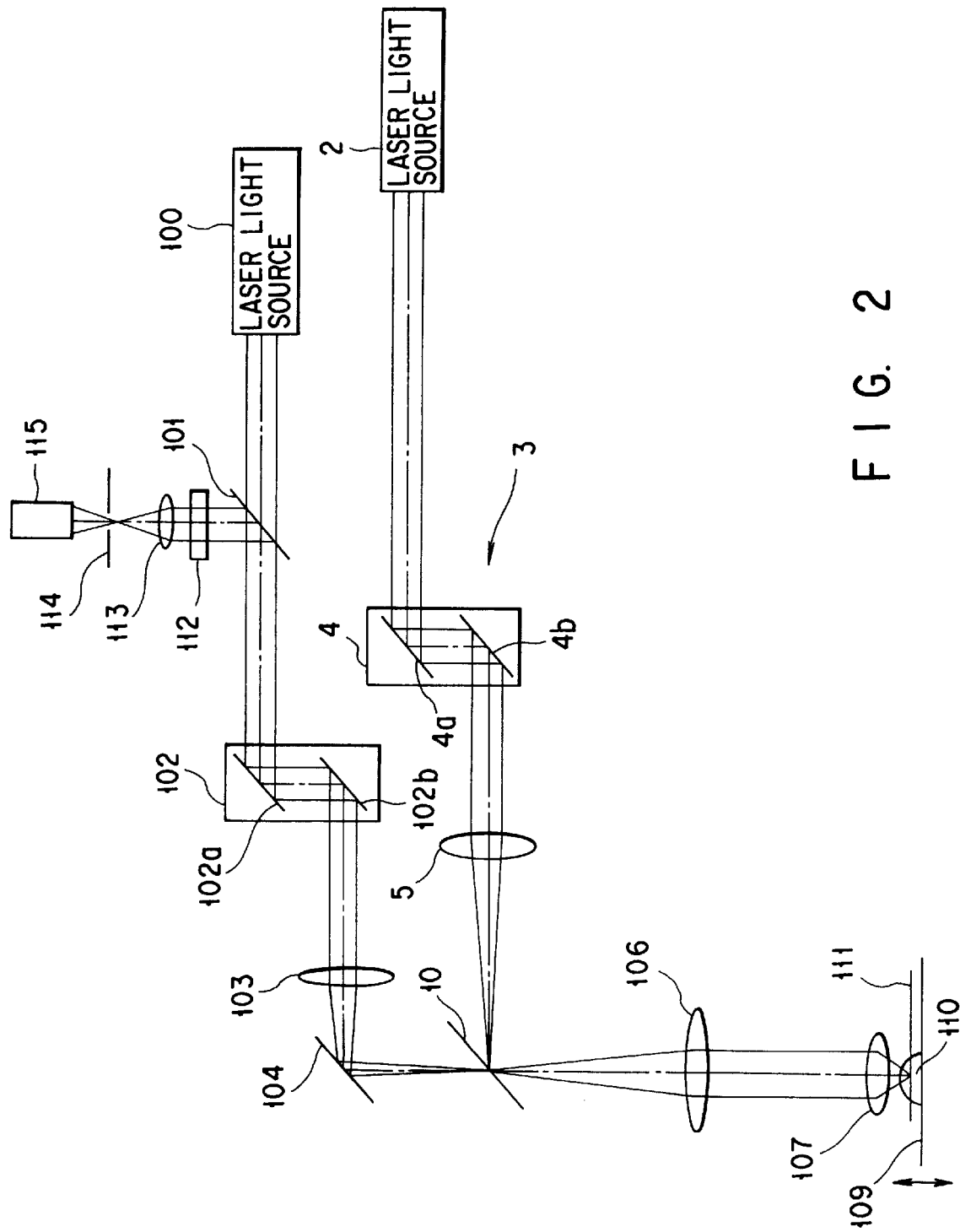
FIG. 2 shows the configuration of a laser scanning microscope according to a second embodiment of the present invention.

FIG. 2 shows the configuration of a laser scanning microscope of the present invention.

The laser scanning microscope forces the optical path of the first scanning optical system 1 for observation to coincide with the optical path of the second scanning optical system 3 in the middle. This enables the single objective 107 to be used in both of the two scanning optical systems.

As in the first embodiment, the second scanning optical system 3 has the function of projecting the coherent light emitted from the second laser light source 2 at a given position on the specimen 110.

The structure where the optical path of the first scanning optical system 1 is forced to coincide with that of the second scanning optical system 3 will be explained. At the focal point of the relay lens 103 in the first scanning optical system 1, the dichroic mirror 10 is provided. The installation location of the dichroic mirror 10 coincides with the focal point of the relay lens 5 in the second scanning optical system 3.

The dichroic mirror 10 has the following characteristic, depending on the output wavelength of the first and second laser light source 100, 2.

To release caged compounds, UV light is normally used. In this connection, the following combinations can be considered.

(a) A combination of a visible continuous light laser (with a wavelength of 488 nm) as the first laser light source 100 and a UV pulse laser (with a wavelength of 351 nm) as the second laser light source 2 can be considered for observation.

(b) A combination of a visible continuous light laser (with a wavelength of 488 nm) as the first laser light source 100 and an IR pulse laser (with a wavelength of 710 nm) as the second laser light source 2 can be considered for observation.

(c) A combination of an IR pulse laser (with a wavelength of 850 nm) as the first laser light source 100 and an IR pulse laser (with a wavelength of 710 nm) as the second laser light source 2 can be considered for observation.

The IR pulse laser is assumed to be a laser capable of inducing two-photon excitation.

FIG. 3 to FIG. 5 each show a transmittance-wavelength characteristic of a dichroic mirror 10 applied to the aforementioned conditions.

FIG. 3 shows the characteristic of the dichroic mirror 10 for combination (a). The dichroic mirror 10 has the property of permitting visible continuous laser (with a wavelength of 488 nm) and its fluorescence (with a wavelength of 530 nm) to pass through and reflecting UV pulse laser (with a wavelength of 351 nm).

FIG. 4 shows the characteristic of the dichroic mirror 10 for combination (b). The dichroic mirror 10 has the property of permitting visible continuous laser (with a wavelength of 488 nm) and its fluorescence (with a wavelength of 530 nm) to pass through and reflecting IR pulse laser (with a wavelength of 710 nm).

FIG. 5 shows the characteristic of the dichroic mirror 10 for combination (c). The dichroic mirror 10 has the property of permitting IR pulse laser (with a wavelength of 850 nm) and its fluorescence (with a wavelength of 530 nm) to pass through and reflecting IR pulse laser (with a wavelength of 710 nm).

The operation of the laser scanning microscope constructed as described above will be explained.

The second scanning optical system 3 is used to project coherent light at a given position on the specimen 110.

The coherent light emitted from the second laser light source 2 is deflected by the scanning mirrors 4a, 4b in the scanning optical unit 4 arbitrarily. The coherent light passes through the relay lens 5 and enters the dichroic mirror 10, which changes the direction of its optical path. The coherent light is caused by the image formation lens 106 to meet the pupil diameter of the objective 107.

The light passed through the image formation lens 106 reaches the objective 107. The light passed through the objective 107 is gathered onto the cross section 111 of the specimen 110 on the stage 109.

Depending on uses, the scanning mirrors 4a, 4b may be caused to scan a particular range, or be stopped to spotlight the specimen. Furthermore, the scanning mirrors 4a, 4b may be caused to skip momentarily to spotlight a plurality of given positions momentarily.

The coherent light emitted from the first laser light source 100 passes through the dichroic mirror 101 and is deflected in the directions of X and the direction of Y by the scanning mirrors 102a, 102b in the scanning optical unit 102.

After the deflected coherent light has passed through the relay lens 103, the direction of its optical path is changed by the mirror 104. Then, the coherent light passes through the dichroic mirror 10 and is caused by the image formation lens 106 to meet the pupil diameter of the objective 107.

The light passed through the image formation lens 106 reaches the objective 107. The light passed through the objective 107 is gathered on the cross section 111 of the specimen 110 on the stage 109.

When the light is projected on the specimen 110 this way, the light excites a fluorescent indicator, which then generates fluorescence.

The fluorescence from the specimen 110 travels backward on the optical path. Specifically, the fluorescence passes through the objective 107, image formation lens 106, dichroic mirror 10, mirror 104, relay lens 103, and individual scanning mirrors 102b, 102a and reaches the dichroic mirror 101. The dichroic mirror 101 reflects the light, which then enters the photometric filter 112.

The photometric filter 112 permits only the fluorescence wavelength from the specimen 110 to pass through. The light is caused by the lens 113 to form an image in the plane of the pin hole 114. The fluorescence passed through the pin hole 114 is measured by the photoelectric conversion element 115.

Use of an IR pulse laser as the first laser light source 100 produces an image by two-photon absorption. At this time, since two-photon absorption takes place only in the image formation position, the pin hole 114 is not needed theoretically. The dichroic mirror 101 has a short-wavelength reflection characteristic to permit IR laser to pass through and reflect visible fluorescence, thereby directing the fluorescence to the photoelectric conversion element 115.

As described above, with the second embodiment, the second scanning optical system 3 is coupled with the first scanning optical system 1 by means of the dichroic mirror 10 and the single objective 107 is used for both of the first and second scanning optical systems 1, 3. The second embodiment therefore produces the same effect as that of the first embodiment.

The advantage of sharing the objective 107 is that two units of the objective 107 are not required and also an extra mechanism below the objective 107 are eliminated as seen from FIG. 1. This helps make the microscope more compact. The simpler configuration also cuts production costs. Another advantage is that use of the common objective 107 eliminates a little magnification error each objective 107 might otherwise have.

(3) Hereinafter, a third embodiment of the present invention will be explained. The same parts as those in FIG. 2 are indicated by the same reference symbols and a detailed explanation of them will not be given.

Figure 6:
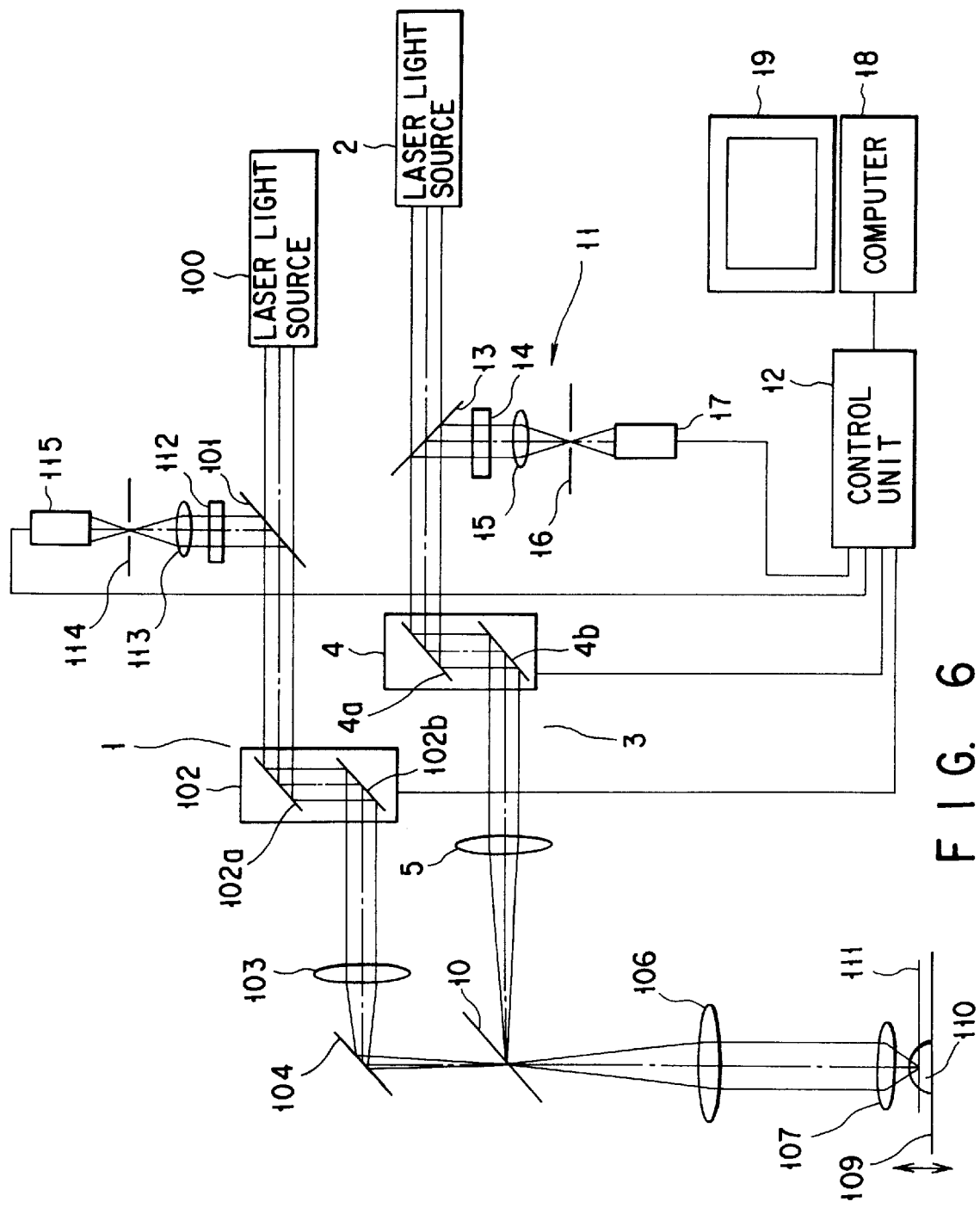
FIG. 6 shows the configuration of a laser scanning microscope according to a third embodiment of the present invention.

FIG. 6 shows the configuration of a laser scanning microscope according to the third embodiment.

In the laser scanning microscope, a sense optical system 11 for observation is also provided in the second scanning optical system 3 and the first and second scanning optical systems 1, 3 are controlled by a single control unit 12.

The sense optical system 11 has the function of sensing the fluorescence generated at the specimen 110 or the reflected light from the specimen 110 while scanning the specimen 110 with the coherent light emitted from the second laser light source 2.

In the sense optical system 11, a dichroic mirror 13 is provided on the optical path between the second laser light source 2 and the scanning optical unit 4. On the optical path of the reflected light from the dichroic mirror 13, a photometric filter 14 that permits only the fluorescence wavelength from the specimen 110 to pass through, a lens 15, a pin hole 16, and a photoelectric conversion element 17.

The control unit 12 has the function of controlling the scanning operation of the scanning optical units 102, 4 in the first and second scanning optical systems 1, 3. The control unit 12 has the function of controlling the operation of the photoelectric conversion elements 115, 17, taking in the electric signals from the photoelectric conversion elements 115, 17, and giving a computer 18 image processing instructions, for example, to superimpose or arrange images.

The computer 18 has the function of displaying the result of image processing on a monitor television 19.

The operation of the laser scanning microscope constructed as described above will be explained.

The coherent light emitted from the first laser light source 100 passes through the dichroic mirror 101 and is deflected in the direction of X and the direction of Y by the scanning mirror 102a, 102b in the scanning optical unit 102. After the coherent light has passed through the relay lens 103, the direction of its optical path is changed by the mirror 104. Then, the coherent light passes through the dichroic mirror 10, image formation lens 106, and objective 107 and is gathered on the cross section 111 of the specimen 110.

The fluorescence from the specimen 110 travels backward on the optical path. Specifically, the fluorescence passes through the objective 107, image formation lens 106, dichroic mirror 10, mirror 104, relay lens 103, and scanning optical unit 102 and reaches the dichroic mirror 101. The dichroic mirror 101 reflects the light, which then enters the photometric filter 112.

The photometric filter 112 permits only the fluorescence wavelength from the specimen 110 to pass through. The fluorescence passed through a pin hole 114 is measured by a photoelectric conversion element 115.

The coherent light emitted from the second laser light source 2 is deflected by the scanning mirrors 4a, 4b in the scanning optical unit 4 arbitrarily. The coherent light then passes through the relay lens 5 and is reflected by the dichroic mirror 10. The reflected light passes through the image formation lens 106 and objective 107 and is gathered on the cross section 111 of the specimen 110.

The reflected light or fluorescence from the specimen 110 passes through the objective 107, image formation lens 106, dichroic mirror 10, relay lens 5, and scanning optical unit 4 and reaches the dichroic mirror 13. The dichroic mirror 13 is replaced with a half mirror in sensing the reflected light from the specimen 110.

The lens 15 causes the reflected light from the specimen 110 with the photometric filter 14 removed or the fluorescence obtained by extracting only the fluorescence wavelength from the light passed through the photometric filter 14 to form an image in the plane of the pin hole 16. The photoelectric conversion element 17 measures the reflected light or the fluorescence passed through the pin hole 16.

The control unit 12 takes in the electric signals from the photoelectric conversion elements 115, 17, and gives a computer 18 image processing instructions, for example, to superimpose or arrange images.

The computer 18 forms images on the basis of the electric signals outputted from the photoelectric conversion elements 115, 17 and performs image processing, including image superposition or image arrangement, and displays the result of image processing on the monitor television 19.

As described above, the third embodiment produces the same effect as the second embodiment does. In the third embodiment, the single control unit 12 controls the scanning operation of the first and second scanning optical units 102, 4. This makes it possible to superimpose or arrange the images from the photoelectric element 115 of the first scanning optical system 1 and the photoelectric element 17 of the second scanning optical system 3 and display the resulting images on the monitor television 19.

Furthermore, two images formed by the scanning of the first and second scanning optical units 102, 4 can be displayed on the monitor television 19 simultaneously. For example, the image formed by the scanning of the second scanning optical unit 4 can be displayed in the image formed by the scanning of the first scanning optical unit 102.

The dichroic mirror 10 may be replaced with a half mirror, provided that the output wavelength of the first laser light source 100 is the same as that of the second laser light source 2.

(4) Hereinafter, a fourth embodiment of the present invention will be explained. The same parts as those in FIG. 2 are indicated by the same reference symbols and a detailed explanation of them will not be given.

Figure 7:
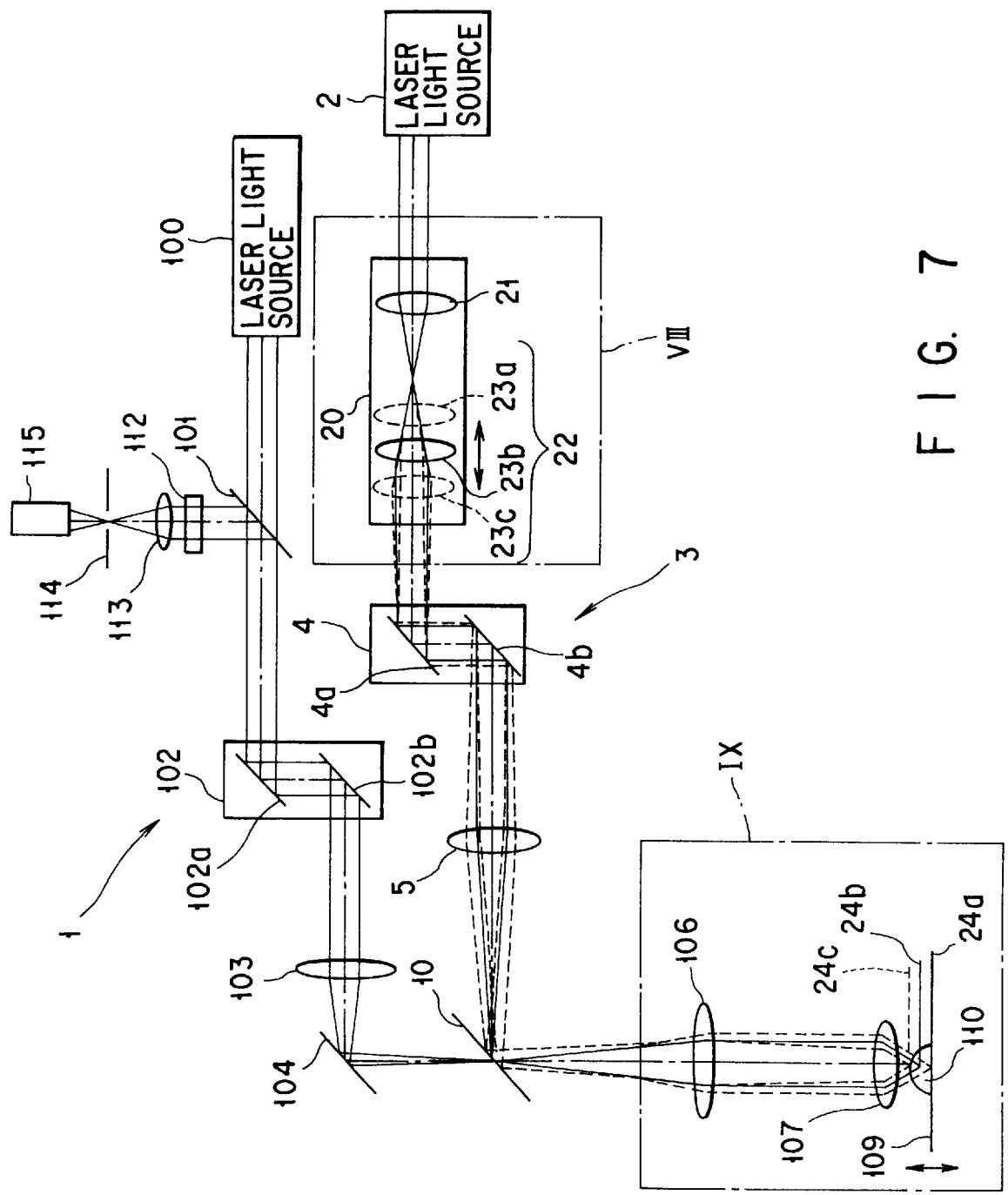
FIG. 7 shows the configuration of a laser scanning microscope according to a fourth embodiment of the present invention.

FIG. 7 shows the configuration of a laser scanning microscope of the fourth embodiment.

On the optical path between the second laser light source 2 and the scanning optical unit 4, an optical adjustment mechanism 20 is provided. The optical adjustment mechanism 20 has the function of shifting the position at which the coherent light projected on the specimen 110 is gathered, along the optical axis of the coherent light.

Specifically, the optical adjustment mechanism 20 converts a bundle of rays of coherent light from the second laser light source 2 so that it may have a given emission angle. The optical adjustment mechanism 20 is composed of a fixed lens 21 and a movable lens 22 that can move freely on the optical axis.

Namely, the optical adjustment mechanism 20 forces the light gathered by the fixed lens 21 to enter the movable lens 22 located in, for example, position 23b, thereby giving the light emitted from the movable lens 22 a given emission angle.

For example, when the movable lens 22 is placed in position 23b, the light emitted from the movable lens 22 will make parallel rays of light.

As described above, when the bundle of rays of coherent light emitted from the optical adjustment mechanism 20 is converted so as to have a given emission angle, the position at which coherent light is gathered on the specimen can be shifted on the optical axis of the coherent light.

Figure 8:
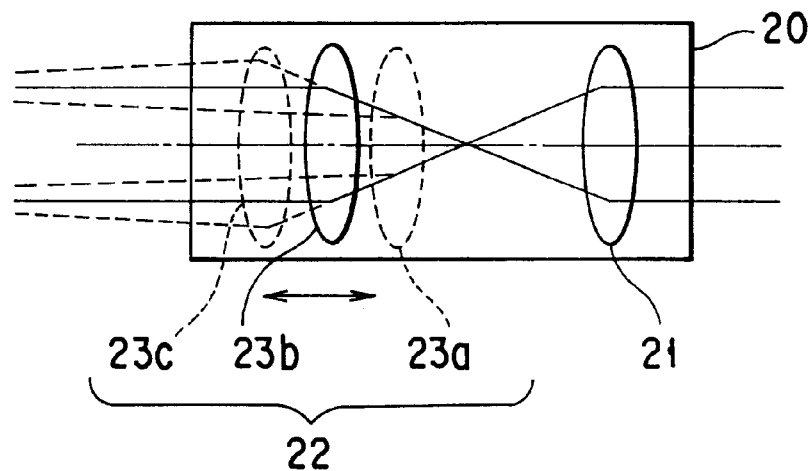
FIG. 8 shows the configuration of an optical adjustment mechanism to help explain the movement of a movable lens.
Figure 9:
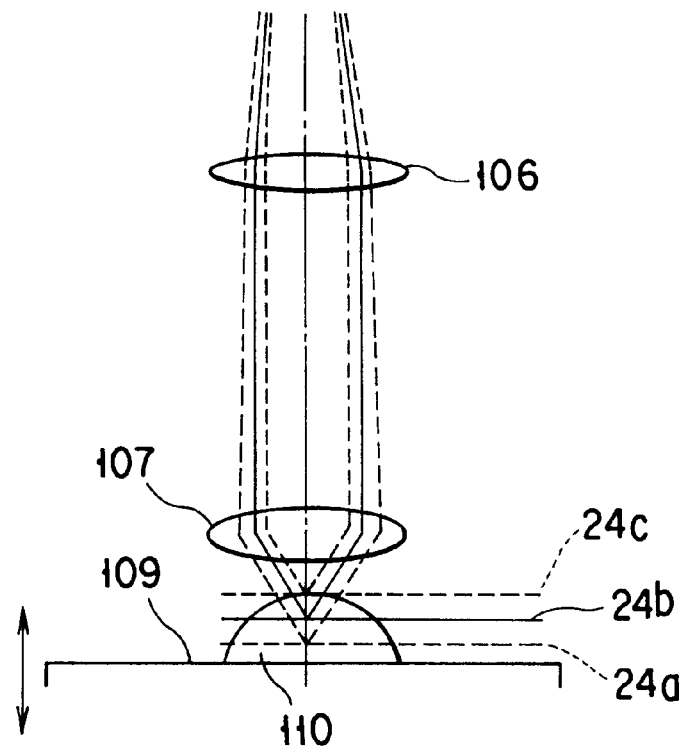
FIG. 9 illustrates the position at which coherent light is gathered by the optical adjustment mechanism.

For example, when the movable lens 22 is moved toward position 23a as shown in FIG. 8, the coherent-light convergence position is shifted toward the cross section 24a of the specimen as shown in FIG. 9. When the movable lens 22 is moved toward position 23c, the coherent-light convergence position is shifted toward the cross section 24c of the specimen. Then, moving the movable lens 22 to the vicinity of position 23b causes the coherent-light convergence position to be shifted to the vicinity of the cross section 24b of the specimen.

The same optical elements are used for both of the relay lens 5 and relay lens 103 and the distance between the image formation lens 106 and the relay lens 5 is made equal to the distance between the image formation lens 106 and the relay lens 103 so that the light convergence positions of the two laser light sources 2, 100 may be, for example, on the same cross section 24b.

The operation of the laser scanning microscope constructed as described above will be explained.

The coherent light emitted from the laser light source 100 passes through the dichroic mirror 101 and is deflected by the scanning mirrors 102a, 102b in the scanning optical unit 102. After the deflected light has passed through the relay lens 103, the mirror 104 changes the direction of the optical path of the coherent light, which then passes through the dichroic mirror 10, image formation lens 106, and objective 107, and is gathered on the cross section 24b of the specimen 110.

The fluorescence from the specimen 110 travels backward on the optical path. Specifically, the fluorescence passes through the objective 107, image formation lens 106, dichroic mirror 10, mirror 104, relay lens 103, and scanning optical unit 102 and reaches the dichroic mirror 101. The dichroic mirror 101 reflects the light, which then enters the photometric filter 112.

The photometric filter 112 permits only the fluorescence wavelength of the specimen 110 to pass through. The fluorescence passed through the pin hole 114 is measured by the photoelectric conversion element 115.

On the other hand, the coherent light emitted from the second laser light source 2 enters the optical adjustment mechanism 20.

The optical adjustment mechanism 20 converts a bundle of rays of coherent light from the second laser light source 2 so that it may have any emission angle according to the locations 23a to 23c of the fixed lens 21 and movable lens 22.

The converted coherent light outputted at a given emission angle from the optical adjustment mechanism 20 is deflected arbitrarily by the scanning mirrors 4a, 4b in the scanning optical unit 4. The deflected light passes through the relay lens 5 and is reflected by the dichroic mirror 10. Then, the coherent light passes through the image formation lens 106 and objective 107 and is gathered on the cross section 111 of the specimen 110.

Depending on uses, the scanning mirrors 4a, 4b may be caused to scan a particular range on the specimen 110, or be stopped to spotlight the specimen. Furthermore, the scanning mirrors 4a, 4b may be caused to skip momentarily to spotlight a plurality of given positions momentarily.

When the movable lens 22 in the optical adjustment mechanism 20 moves in the range from position 23a to position 23c, the position at which the coherent light is gathered on the specimen 110 is shifted along the optical axis of the coherent light.

For example, when the movable lens 22 is moved toward position 23a as shown in FIG. 8, the coherent-light convergence position is shifted toward the cross section 24a of the specimen as shown in FIG. 9. Conversely, when the movable lens 22 is moved toward position 23c, the coherent-light convergence position is shifted toward the cross section 24c of the specimen. Then, moving the movable lens 22 to the vicinity of the position 23b causes the coherent-light convergence position to be shifted to the vicinity of the cross section 24b of the specimen.

As described above, in the fourth embodiment, the optical adjustment mechanism 20 has been provided which converts a bundle of rays of coherent light from the second laser light source 2 so that it may have a given emission angle and shifts the coherent-light convergence position at the specimen along the optical axis. There may a case where the region on which laser light is projected and the cross section the researcher wants to observe are not necessarily in the same plane, particularly where although projecting laser light on part of a cross section, the researcher wants to get an image of a different cross section. For instance, after stimulation has been given to the sympathetic nerve outside an artery, it is determined what response has occurred in the smooth muscle or endothelial cells inside the artery.

Even when the cross section to be observed and the cross section on which laser light is projected are not in the same plane, this is coped with by moving the movable lens 22 in the optical adjustment mechanism 20. Specifically, when the second scanning optical system 3 is caused to project coherent light on the specimen 110 in the middle of observing and recording an image of the specimen with the first scanning optical system 1, this makes it possible to examine the dynamic characteristic (chemical reaction) of the specimen 110 induced by the projection of coherent light by the second scanning optical system 3.

The predetermination of the positional relationship between the movement of the movable lens 22 and the light convergence positions 24a to 24c enables the movement of the stage 109 to be correlated with the movement of the movable lens 22. Moreover, even when the stage 109 has gone up or down, the adjustment of the movable lens 22 enables the coherent light to be projected on a given position on the specimen 110. That is, while a tomographic image in a given plane of the specimen 110 is being acquired with the first scanning optical system 1, the coherent light can be projected on a given region of the specimen with the second scanning optical system 3.

(5) Hereinafter, a fifth embodiment of the present invention will be explained. The same parts as those in FIG. 2 are indicated by the same reference symbols and a detailed explanation of them will not be given.

Figure 10:
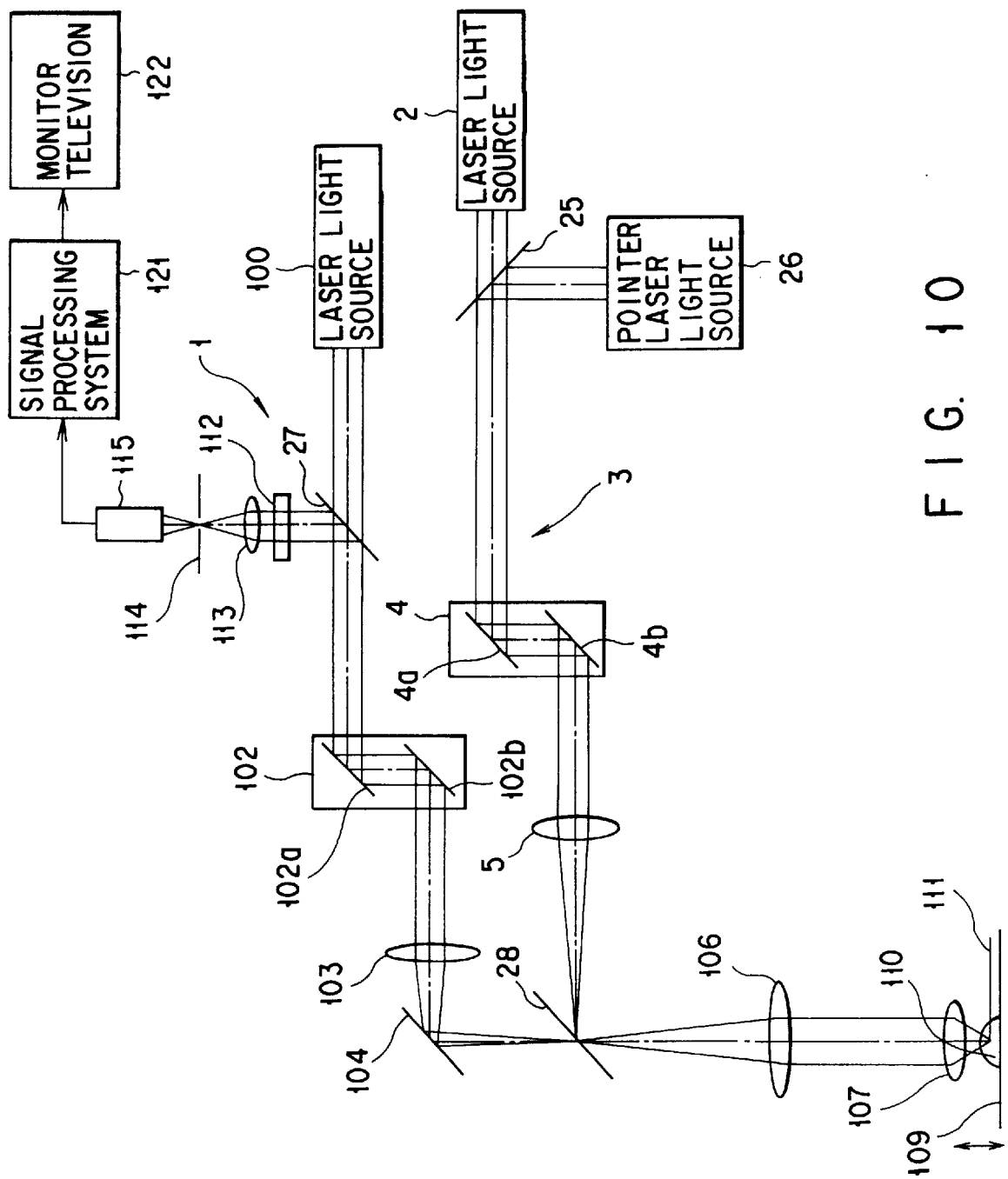
FIG. 10 shows the configuration of a laser scanning microscope according to a fifth embodiment of the present invention.

FIG. 10 shows the configuration of a laser scanning microscope according to the fifth embodiment.

The second scanning optical system 3 projects coherent light at a given position on the specimen 110. On the optical path of the second scanning optical system 3, a position check pointer laser light source 26 is provided via a dichroic mirror 25.

The pointer laser light source 26 has the function of outputting pointer laser light with a wavelength that has no effect on the specimen 110 when the light is projected on the specimen 110, for example, a wavelength of 650 nm.

When the pointer laser light source 26 is used, the characteristics of the dichroic mirrors 27, 28 in checking the position by means of the reflected light from the specimen 110 are as follows.

As explained in the second embodiment, to release caged compounds, UV light is normally used. In this connection, the following combinations can be considered.

(a) A combination of a visible continuous light laser (with a wavelength of 488 nm) as the first laser light source 100 and a UV pulse laser (with a wavelength of 351 nm) as the second laser light source 2 can be considered for observation.

(b) A combination of a visible continuous light laser (with a wavelength of 488 nm) as the first laser light source 100 and an IR pulse laser (with a wavelength of 710 nm) as the second laser light source 2 can be considered for observation.

(c) A combination of an IR pulse laser (with a wavelength of 850 nm) as the first laser light source 100 and an IR pulse laser (with a wavelength of 710 nm) as the second laser light source 2 can be considered for observation.

The IR pulse laser is assumed to be a laser capable of inducing two-photon excitation.

Figure 11:
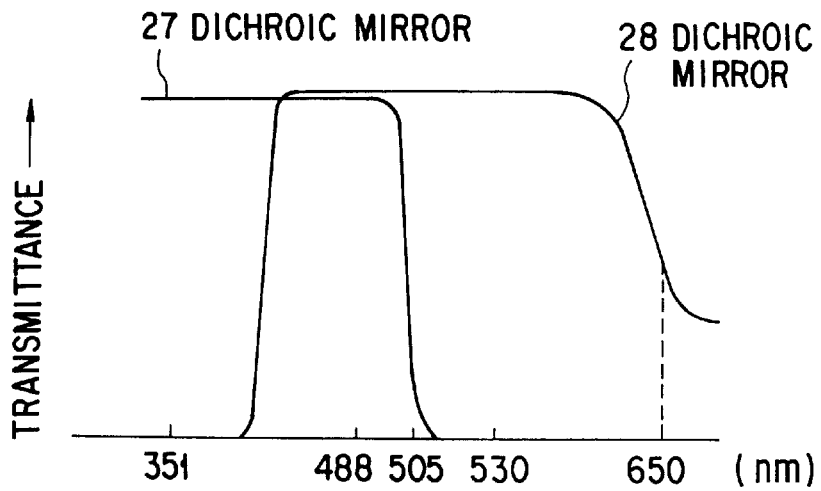
FIG. 11 is a transmittance-wavelength characteristic diagram of a dichroic mirror applied to the microscope.
Figure 12:
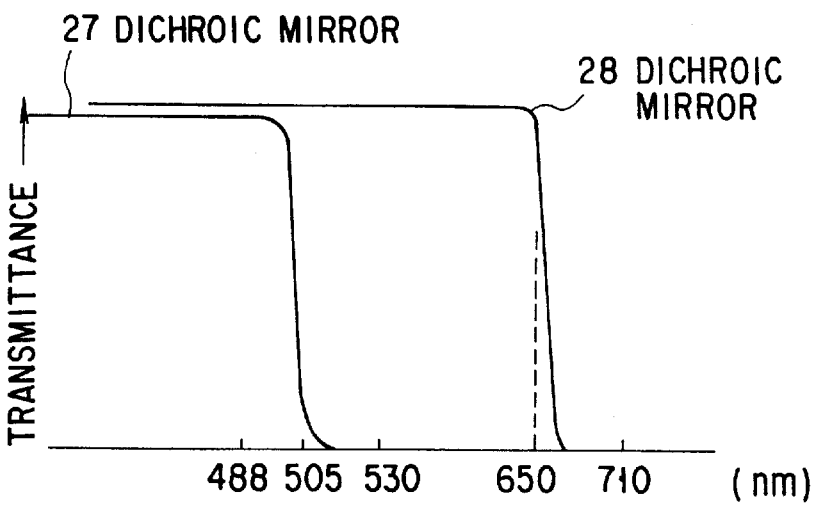
FIG. 12 is a transmittance-wavelength characteristic diagram of a dichroic mirror applied to the microscope.
Figure 13:
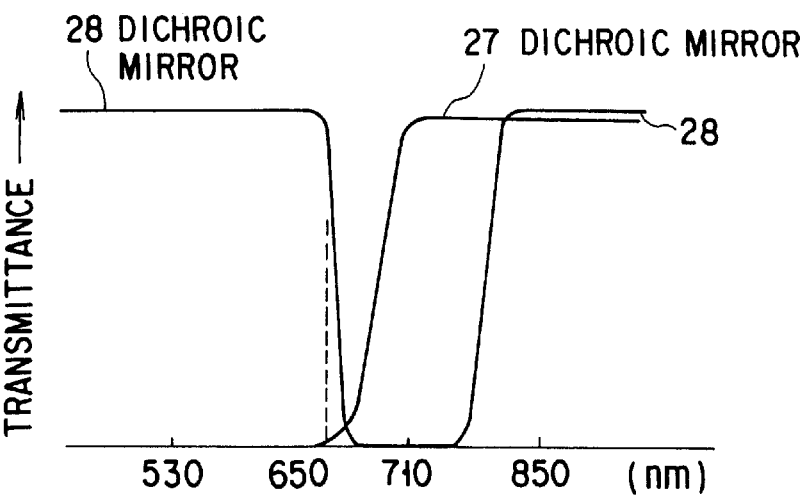
FIG. 13 is a transmittance-wavelength characteristic diagram of a dichroic mirror applied to the microscope.

FIG. 11 to FIG. 13 a transmittance-wavelength characteristics of dichroic mirrors 27, 28 applied to the aforementioned conditions.

FIG. 11 shows the characteristic of the dichroic mirror 28 for combination (a). The dichroic mirror 23 has the property of permitting visible continuous laser (with a wavelength of 488 nm) and its fluorescence (with a wavelength of 530 nm) to pass through and reflecting UV pulse laser (with a wavelength of 351 nm). The dichroic mirror 28 is set to about a transmittance of 50% for a wavelength of 650 nm.

FIG. 12 shows the characteristic of the dichroic mirror 28 for combination (b). The dichroic mirror 28 has the property of permitting visible continuous laser (with a wavelength of 488 nm) and its fluorescence (with a wavelength of 530 nm) to pass through and reflecting IR pulse laser (with a wavelength of 710 nm).

FIG. 13 shows the characteristic of the dichroic mirror 28 for combination (c). The dichroic mirror 28 has the property of permitting IR pulse laser (with a wavelength of 850 nm) and its fluorescence (with a wavelength of 530 nm) to pass through and reflect IR pulse laser (with a wavelength of 710 nm). The dichroic mirror 27 is set as small as possible for a wavelength of 650 nm.

When the laser light source 2 can emit laser light at more than one wavelength, including a wavelength other than the one for the original purpose, for example, laser light with the same wavelength as that of the pointer laser light source 26, use of an excitation filter at the emitting end of the laser light source 2 makes the pointer laser light source 26 and dichroic mirror 25 unnecessary. Even in this case, the same effect is produced.

To the output terminal of the photoelectric conversion element 115, for example, a signal processing system 121 is connected. The signal processing system 121 has the function of subjecting electric signals to image processing and displaying an image of the specimen 110 on a monitor television 122.

The operation of the laser scanning microscope constructed as described above will be explained.

First, the operation of the first scanning optical system 1 produces an image of the specimen 110.

Specifically, the coherent light emitted from the first laser light source 100 passes through the dichroic mirror 27 and is deflected by the scanning mirrors 102a, 102b in the scanning optical unit 102.

After the deflected coherent light has passed through the relay lens 103, the direction of its optical path is changed by the mirror 104. The light passes through the dichroic mirror 28. The coherent light is caused by the image formation lens 106 to meet the pupil diameter of the objective 107.

The light passed through the image formation lens 106 reaches the objective 107. The light passed through the objective 107 is gathered on the cross section 111 of the specimen 110 on the stage 109.

When the light is projected on the specimen 110 this way, the light excites a fluorescent indicator, which then generates fluorescence.

The fluorescence from the specimen 110 travels backward on the optical path. Specifically, the fluorescence passes through the objective 107, image formation lens 106, dichroic mirror 28, mirror 104, relay lens 103, and individual scanning mirrors 102b, 102a and reaches the dichroic mirror 27. The dichroic mirror 27 reflects the light, which then enters the photometric filter 112.

The photometric filter 112 permits only the fluorescence wavelength from the specimen 110 to pass through. The light is caused by the lens 113 to form an image in the plane of the pin hole 114. The fluorescence passed through the pin hole 114 is measured by the photoelectric conversion element 115.

The electric signal outputted from the photoelectric conversion element 115 is sent to the signal processing system 121. The signal processing system 121 provides the image processing of the electric signal and displays an image of the specimen 110 on the monitor television 122.

Next, with the second laser light source 2 off, the pointer laser light source 26 outputs coherent light.

The coherent light is forced by the dichroic mirror 25 to advance along the same optical axis as that of the second scanning optical system 3 and is deflected arbitrarily by the scanning mirrors 4a, 4b in the scanning optical unit 4. The coherent light then passes through the relay lens 5 and enters the dichroic mirror 28, which changes the direction of its optical path. The coherent light then passes through the image forming lens 106 and objective 107 and is gathered on the cross section 111 of the specimen 110.

The reflected light or fluorescence from the specimen 110 passes through the objective 107, image formation lens 106, dichroic mirror 28, mirror 104, relay lens 103, and scanning unit 102 and reaches the dichroic mirror 27.

The lens 113 causes the reflected light from the specimen 110 with the photometric filter 112 removed or the fluorescence obtained by extracting only the fluorescence wavelength from the light passed through the photometric filter 112 to form an image in the plane of the pin hole 114. The fluorescence passed through the pin hole 114 is caught by the photoelectric conversion element 115.

The electric signal outputted from the photoelectric conversion element 115 is sent to the signal processing system 121 as described above. The signal processing system 121 provides the image processing of the electric signal to produce an image of the specimen 110 and displays the image on the monitor television 122.

Therefore, the image formed by gathering rays of the position check coherent light is superimposed on the image of the specimen 110 formed by the first scanning optical system 1 on the screen of the monitor television.

If the wavelength of the laser light source 100 is the same as that of the pointer laser light source 26, an image where only the position at which the pulse light has been projected looks brighter appears.

When the wavelength of the laser light source 100 differs from that of the laser light source 26, the image is sensed at a wavelength differing from that of the overall image of the fluorescence specimen obtained using the coherent light from the laser light source 100. To do this, a dichroic mirror, a photometric filter, a lens, a pin hole, and a photoelectric conversion element have to be further provided between the dichroic mirror 27 and the photometric filter 112.

As a result, the pointer laser light source 26, dichroic mirror, and the wavelength at the photometric filter are selected so that only the image formed by the coherent light emitted from the pointer laser light source 26 may be sensed.

The convergence position of the position check coherent light is the same as that during the operation of the second laser light source 2.

Therefore, while watching the screen on the monitor television 122, the operator operates the second scanning optical system 3 until the position check coherent-light convergence position has coincided with, for example, the region at which chemical reaction is required to take place.

After the position check coherent-light convergence position has coincided with the region at which chemical reaction is required to take place, the second laser light source 2 outputs coherent light.

The coherent light emitted from the second laser light source 2 is deflected by the scanning mirrors 4a, 4b in the scanning optical unit 4. The coherent light passes through the relay lens 5 and is reflected by the dichroic mirror 28. The reflected light is caused by the image formation lens 106 to meet the pupil diameter of the objective 107.

The light passed through the image formation lens 106 reaches the objective 107. The light passed through the objective 107 is gathered on the cross section 111 of the specimen 110 on the stage 109.

At this time, because the first scanning optical system 1 senses the image of the cross section 111 of the specimen 110 and displays it on the monitor television 122 as described above, this makes it possible to observe the dynamic characteristic when the second scanning optical system 3 has projected coherent light on the specimen 110.

As described above, in the fifth embodiment, the pointer laser light source 26 is provided via the dichroic mirror 25 on the optical path of the scanning optical system 3 that projects coherent light at a given position on the specimen 110. This makes it possible to check the location of the region on which coherent light is to be projected with respect to the entire image of the specimen 110, before coherent light is projected on the specimen 110 to cause, for example, chemical reaction.

Use of the pointer laser light source 26 is not limited to the fifth embodiment. For example, the pointer laser light source may be provided in the second scanning optical system 3 in each of the first to fourth embodiments. This makes it possible to check the region in which, for example, chemical reaction is to be caused by projecting coherent light on the specimen 110.

Figure 14:
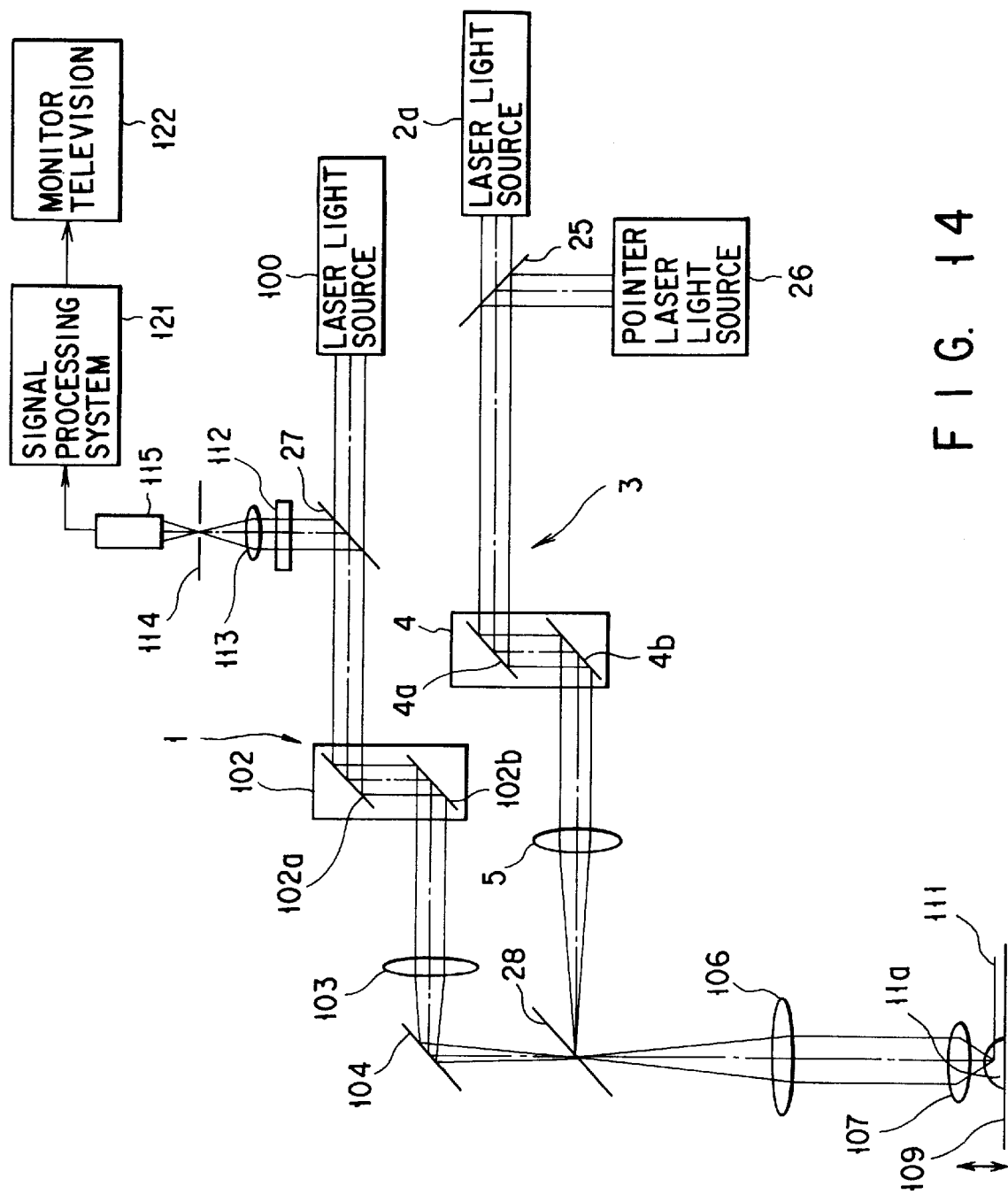
FIG. 14 shows the configuration of a laser scanning microscope applied to industrial laser machining.

FIG. 14 shows the configuration of a laser scanning microscope of the fifth embodiment applied to industrial laser machining.

A gas (e.g., $CO_2$) laser oscillation unit is used as the second laser light source 2a. Instead of the specimen, a workpiece 11a is placed on the stage 109.

In this case, all of the dichroic mirror 25, scanning optical unit 4, relay lens 5, dichroic mirror 28, image formation lens 106, and objective 107 must be designed to withstand the laser output of the laser light source 2a.

With such a configuration, it is possible to check the alignment of the portion to be laser-machined on the overall image of the workpiece 11a before projecting coherent light on the workpiece 11a for laser machining.

(6) Hereinafter, a sixth embodiment of the present invention will be explained. The same parts as those in FIG. 1 are indicated by the same reference symbols and a detailed explanation of them will not be given.

FIG. 15 shows the configuration of a laser scanning microscope of the sixth embodiment.

On the optical path between the second laser light source 2 and the scanning optical unit 4, an optical adjustment mechanism 20 is provided. The optical adjustment mechanism 20 shifts the position at which coherent light projected on the specimen 110 is gathered, along the optical axis of the coherent light.

The optical adjustment mechanism 20 converts a bundle of rays of coherent light from the second laser light source 2 so that it may have a given emission angle. For example, when the movable lens 22 is moved toward position 23a, the coherent-light convergence position is shifted toward the cross section 29a of the specimen. Conversely, when the movable lens 22 is moved toward position 23c, the coherent-light convergence position is shifted toward the cross section 29c of the specimen. Then, moving the movable lens 22 to the vicinity of the position 23b causes the coherent-light convergence position to be shifted to the vicinity of the cross section 29b of the specimen.

The operation of the laser scanning microscope constructed as described above will be explained. The operation of the first scanning optical system 1 is the same as that in the first embodiment, so explanation of it will not be given. The operation of the optical adjustment mechanism 20 will be described.

The coherent light emitted from the second laser light source 2 enters the optical adjustment mechanism 20. The optical adjustment mechanism 20 converts a bundle of rays of coherent light from the second laser light source 2 so that it may have any emission angle according to the locations 23a to 23c of the fixed lens 21 and movable lens 22.

The converted coherent light outputted at a given emission angle from the optical adjustment mechanism 20 is deflected arbitrarily by the scanning mirrors 4a, 4b in the scanning optical unit 4. The deflected light passes through the relay lens 5 and the direction of its optical path is changed by the mirror 6. Then, the coherent light passes through the image formation lens 7 and objective 7 and is gathered in the range of the cross sections 29a to 29c of the specimen 110.

Depending on uses, the scanning mirrors 4a, 4b may be caused to scan a particular range on the specimen 110, or be stopped to spotlight the specimen. Furthermore, the scanning mirrors 4a, 4b may be caused to skip momentarily to spotlight a plurality of given positions momentarily.

When the movable lens 22 in the optical adjustment mechanism 20 moves in the range from position 23a to position 23c, the position at which the coherent light is gathered on the specimen 110 is shifted along the optical axis of the coherent light.

For example, when the movable lens 22 is moved toward the position 23a, the coherent-light-gathering position is shifted toward the cross section 29a of the specimen. Conversely, when the movable lens 22 is moved toward position 23c, the coherent-light convergence position is shifted toward the cross section 29c of the specimen. Then, moving the movable lens 22 to the vicinity of position 23b causes the coherent-light convergence position to be shifted to the vicinity of the cross section 24b of the specimen.

As described above, in the sixth embodiment, the optical adjustment mechanism 20 has been provided which converts a bundle of rays of coherent light from the second laser light source 2 so that it may have a given emission angle and shifts the coherent-light convergence position at the specimen along the optical axis. As in the fourth embodiment, there may a case where the region on which laser light is projected and the cross section the researcher wants to observe are not necessarily in the same plane, particularly where although projecting laser light on part of a cross section, the researcher wants to get an image of a different cross section. For instance, after stimulation has been given to the sympathetic nerve outside an artery, it is determined what response has occurred in the smooth muscle or endothelial cells inside the artery.

Even when the cross section to be observed and the cross section on which laser light is to be projected are not in the same plane, this is coped with by moving the movable lens 22 in the optical adjustment mechanism 20. Specifically, when the second scanning optical system 3 is caused to project coherent light on the specimen 110 in the middle of observing and recording an image of the specimen with the first scanning optical system 1, this makes it possible to examine the dynamic characteristic (chemical reaction) of the specimen 110 induced by the projection of coherent light by the second scanning optical system 3.

The first to sixth embodiments may be modified as follows.

For example, the pointer laser light source 26 of the fifth embodiment may be added to the fourth embodiment of FIG. 7.

In the laser projection position checking method, the movable lens 22 is located in position 23b and the tomographic image on which laser light is to be projected and the tomographic image to be observed are recorded. Then, the distance between the two sectional layers is measured.

When the movement of the movable lens 22 is correlated beforehand to the image formation position after the emission of light from the objective 107, this determines the movement of the movable lens 22.

To obtain an image of a sectional layer 29b by projecting laser light on a sectional layer 29c shown in FIG. 15, the movable lens 22 is located in position 23c. To check to see if laser light forms an image on the sectional layer 29c, the stage 109 is moved upward by the difference between the sectional layers 29b and 29c. This enables the photoelectric conversion element 115 to sense the fluorescence or transmitted light from the specimen 110 caused by the coherent light from the pointer laser light source 26. After this, the stage 109 is returned to the original position for measurement.

The number of sets of the laser light source and its scanning optical system is not limited to two. Use of more than two sets of the laser light source and its scanning optical system makes it possible to carry out, at several places, the observation and recording of a given position on the specimen 110 and the examination of the dynamic characteristic at a given position on the specimen 110.

(7) Hereinafter, a seventh embodiment of the present invention will be explained.

Figure 16:
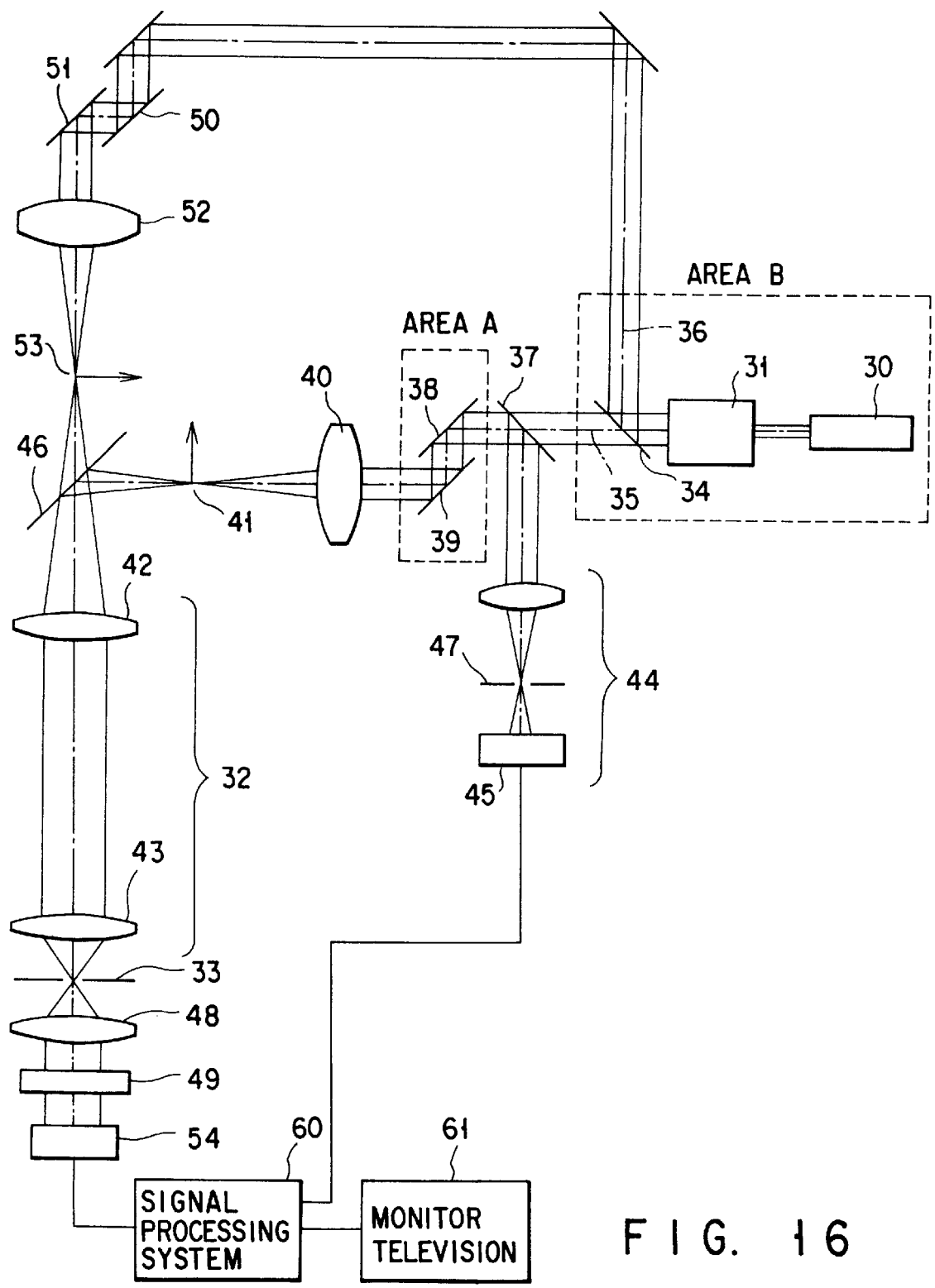
FIG. 16 shows the configuration of a laser scanning microscope according to a seventh embodiment of the present invention.

FIG. 16 shows the configuration of a laser scanning microscope of the seventh embodiment.

A laser light source 30 generates sub-picosecond monochromatic coherent light pulses with a wavelength in the near infrared range. A bundle-of-rays conversion optical system 31 collimates a bundle of rays. An objective system 32 is provided. Numeral 33 indicates the surface of a specimen.

A dichroic mirror 34 reflects relatively short wavelengths (e.g., about 700 mm) in the near infrared range and permits relatively long wavelength (e.g., about 850 mm) to pass through. Numeral 35 indicates a bundle of rays of light traveling straight and numeral 36 represents a bundle of rays of light bent at right angles.

A dichroic mirror 37 permits near infrared rays to pass through and reflects visible rays.

On one branch optical path of the dichroic mirror 37, there are provided a pair of galvanomirrors 38 and 39, a pupil projection lens 40, an image position 41 in an objective lens system 32, an image formation lens 42, and an objective 43. On the other optical path of the dichroic mirror 37, there are provided a sense optical system 44 and a sensor 45 of the sense optical system 44.

A dichroic mirror 46 reflects relatively long wavelengths (e.g., about 850 mm) in the near infrared range and permits relatively short wavelengths (e.g., about 700 mm) in the near infrared range to pass through.

In the sense optical system 44, a pin hole 47 is provided.

On the opposite side of the surface 33 of the specimen from the objective 43, there are provided a condenser lens 48, a near-infrared-ray cut filter 49, and a sensor 54.

FIGS. 17 and 18 each show a partial configuration of another replaceable optical system in area A and area B of FIG. 16.

In FIG. 17, numeral 55 indicates a pupil relay optical system. In FIG. 18, numeral 36 indicates a bundle of rays obtained by collimating rays of second near infrared laser light.

On the other branch optical path of the dichroic mirror 34, two galvanomirrors 50, 51 are provided. These galvanomirrors 50, 51 are located close to each other to deflect a bundle of rays in the direction of X and the direction of Y. On the emission optical path of the galvanomirrors 50, 51, a pupil projection lens 52 is provided. The image position 53 in the objective lens system 32 is formed on the emission optical path.

The operation of the laser scanning microscope constructed as described above will be explained.

The laser light source 30 generates sub-picosecond monochromatic coherent light pulses with a wavelength in the near infrared range. A bundle of rays from the laser light source 30 is directed into the bundle-of-rays conversion optical system 31, which converts it into collimated light of the desired size.

The collimated light strikes the dichroic mirror 34. The dichroic mirror 34 reflects relatively short wavelengths (e.g., about 700 mm) in the near infrared range and permits relatively long wavelength (e.g., about 850 mm) to pass through. Therefore, the dichroic mirror 34 divides the collimated light into two bundles of rays: a bundle of rays 35 traveling straight and a bundle of rays 36 bent at right angles.

The traveling-straight bundle of rays 35 passes through the dichroic mirror 37 that permits infrared rays to pass through and reflects visible light and is deflected in the direction of X and the direction of Y by the two galvanomirrors 38, 39 placed close to each other. The deflected bundle of rays is gathered at the image position 41 in the objective system 32 composed of the image formation lens 42 and objective 43.

At this time, the pupil projection lens 40 projects the mid-point between the two galvanomirrors 38, 39 onto the vicinity of the pupil position of the objective system 32.

A spot of the bundle of rays 35 gathered at the image position 41 in the objective system 32 and subjected to raster scanning is projected by the objective system 32 on the specimen 33 to make a very small spot on the specimen's furnace. Raster scanning is done with the very small spot.

Fluorescence generated at the specimen 33 as a result of the absorption of two photons (or more than two photons) travels backward on the optical path and is reflected by the dichroic mirror 37. The reflected light is introduced into the sense optical system 44.

Since the pin hole 47 is provided in the light convergence position in the sense optical system 44, a co-focal point system is made. This further improves the resolution in the direction of optical axis.

Because unnecessary rays of light, including flare, can be removed, the contrast is also improved. The pin hole 47 may be always in the optical path or inserted and removed as the need arises. It is desirable that the diameter of the pin hole should be changed according to the objective or the wavelength to be used.

The fluorescence from the specimen 33 may be sensed by the sensor 54 via the condenser lens 48 and near-infrared-ray cut filter 49 provided on the opposite side of the specimen from the objective 43. In this case, the sensed fluorescence signal is converted by the sensor 45, 54 into an electric signal. The electric signal passes through a signal processing system 60 and is displayed on a monitor television 61 in the form of images.

On the other hand, the bundle of rays 36 bend at right angles by the dichroic mirror 34 is deflected by the two galvanomirrors 50, 51 located close to each other in the directions crossing at right angles to each other. The deflected bundle of rays is gathered by the pupil projection lens 52 at the image position 53 in the objective system 32 composed of the image formation lens 42 and objective 43.

At this time, the pupil projection lens 52 projects the mid-point between the two galvanomirrors 50, 51 onto the vicinity of the pupil position of the objective system 32.

The spot gathered at the image position 53 in the objective system 32 strikes the dichroic mirror 46 placed between the image position 53 and the image formation lens 42.

The dichroic mirror 46 reflects relatively long wavelengths (e.g., about 850 mm) in the near infrared range and permits relatively short wavelength (e.g., about 700 mm) to pass through in the near infrared range.

The bundle of rays passed through the dichroic mirror 46 is directed to the objective system 32, which projects it at any position on the specimen 33 in the form of a very small spot. As a result, chemical reaction is induced by the absorption of two photons (or more than two photons).

When scanning is done by the two galvanomirrors (scanners) 50, 51 arranged close to each other, it is desirable for the pupil position to be near the mid-point between the two galvanomirrors. The pupil position, however, may be on either scanner. In the scanning optical system, area A may be replaced with a relay optical system 55 provided between the scanners as shown in FIG. 17.

Furthermore, area B may be replaced with a structure where the collimated light is divided by the dichroic mirror 34 into two bundle of rays beforehand and they are adjusted by separate bundle-of-rays conversion optical systems 31 to the collimated lights 35, 36 of the desired size.

FIGS. 19 to 21 each show the relationship between the wavelength and transmittance as examples of the spectral characteristic of the dichroic mirrors 34, 37, and 46 shown in FIG. 16, respectively.

Specifically, the wavelength of near infrared laser light is set at 700 nm and the caged indicator is released by two-photon absorption in any position on the specimen. Then, the wavelength of near infrared laser light is set at 850 nm and fluorescence imaging is done by two-photon absorption The advantages of using two-photon absorption are that UV applications (e.g., a fluorescence indicator based on ultraviolet excitation) can be achieved without using ultraviolet rays, that the nonlinear effect of two photons themselves improves both of the plane resolution and the optical-axis-direction resolution without using a confocal system, that using no ultraviolet rays facilitates the design of the optical system, that a thick specimen can be dealt with by using ultraviolet rays, since the degree of scattering in a specimen depends on the wavelength, and that using no ultraviolet rays has adverse effect on a living specimen.

(8) Hereinafter, an eighth embodiment of the present invention will be explained.

Figure 22:
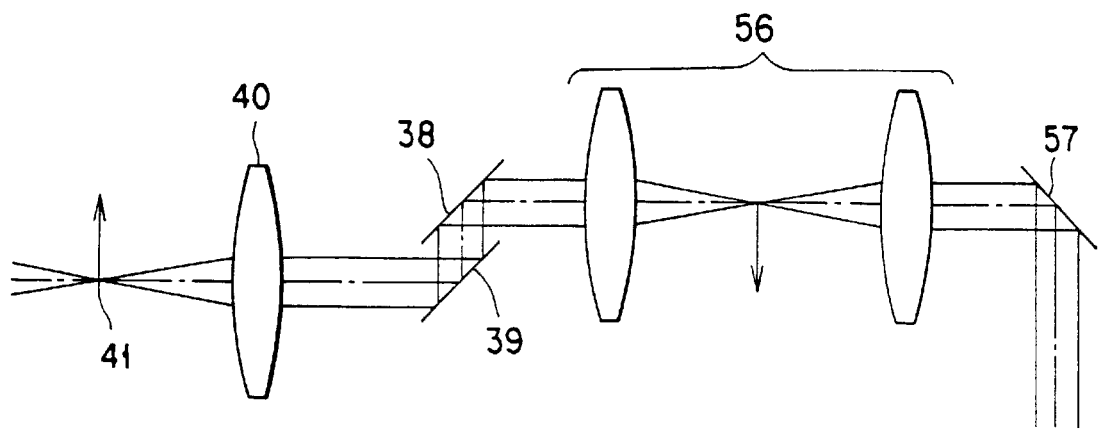
FIG. 22 shows the configuration of a laser scanning microscope according to an eighth embodiment of the present invention.
Figure 23:
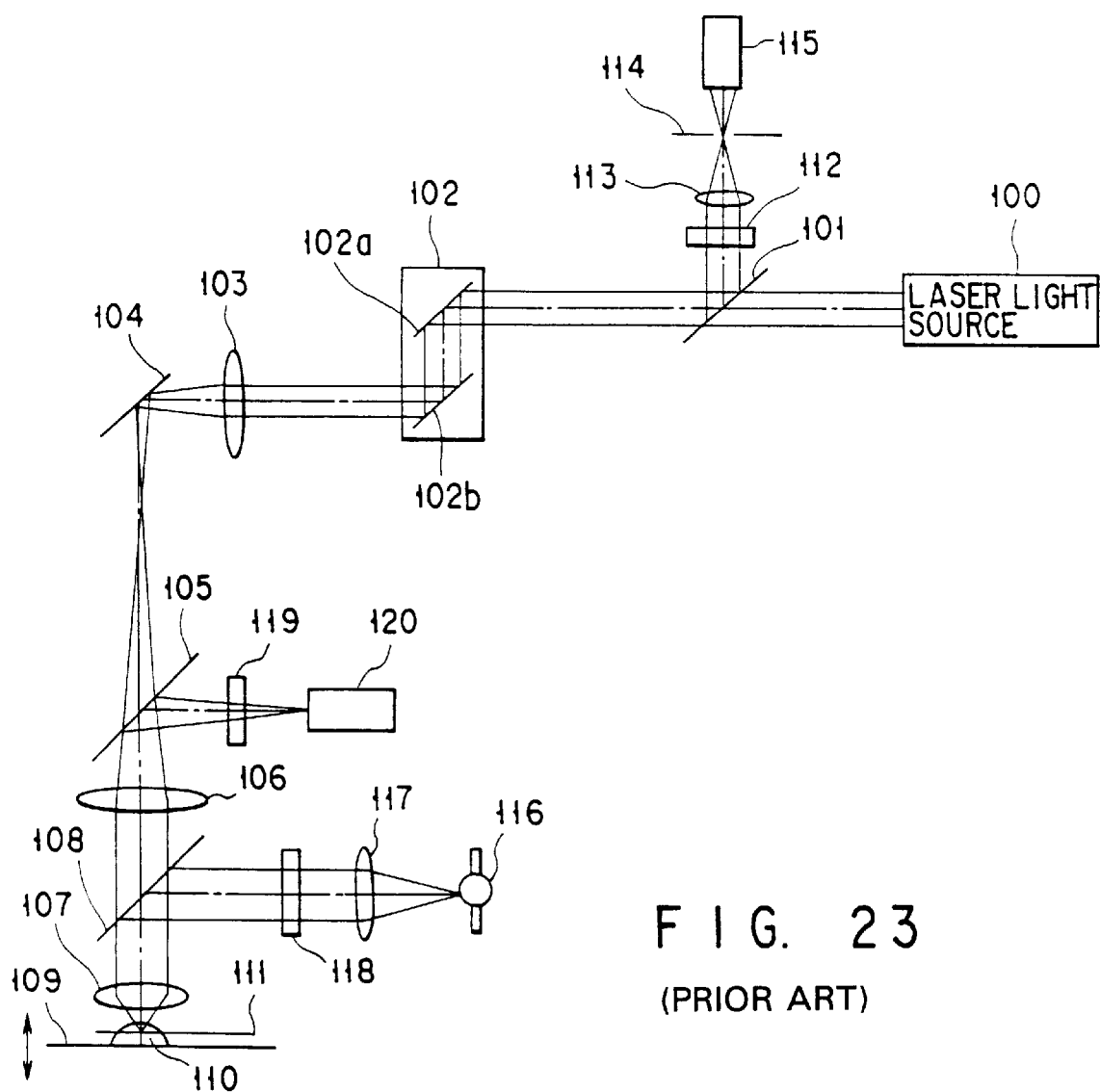
FIG. 23 shows the configuration of a conventional laser scanning microscope.

FIG. 22 shows the configuration of a laser scanning microscope of the eighth embodiment. The overall configuration of the eighth embodiment is the same as that of the seventh embodiment except for the scanning optical system. Therefore, only the scanning optical system will be explained.

A pupil relay optical system 56 and a resonance galvanomirror 57 are provided between the dichroic mirror 37 and two galvanomirrors 38, 39.

The operation of the laser scanning microscope constructed as described above will be explained.

A bundle of near infrared rays passed through the dichroic mirror 37 is deflected by the resonance galvanomirror 57 in the direction of X (laterally on the monitor) at a high speed.

The deflected bundle of rays is relayed by the pupil relay optical system 56 and deflected in the direction of X and the direction of Y by the two galvanomirrors 38, 39 arranged close to each other. The bundle of rays deflected in the directions of X and Y is gathered by the pupil projection lens 40 at the image position 41 in the objective system 32 composed of the image formation lens 42 and objective 43.

At this time, the pupil relay optical system 56 projects the position of the resonance galvanomirror 57 on the mid-point between the two galvanomirrors 38, 39. In addition, the pupil projection lens 40 projects the position of the resonance galvanomirror 57 onto the vicinity of the pupil position in the objective system 32.

To acquire the fluorescence generated by the absorption of two photons (or more than two photons) at high speed in the form of images, scanning is done by using the resonance galvanomirror 57 and the Y-direction galvanomirror 39, with the X-direction galvanomirror 38 fixed. This makes it possible to acquire images at a speed faster than the video rate.

In contrast, to scan darker images at low speeds or to cause chemical reaction by the absorption of two photons (or more than two photons) in any position on the surface of the specimen, the resonance galvanomirror 57 is fixed and scanning id done by the X- and Y-direction galvanomirrors 38, 39.

While in the eighth embodiment, the oscillation galvanomirror 57 has been used as a high-speed scanner, an acoustooptic element (AOD) or a polygon mirror may be used. Of these high-speed scanners, an acoustooptic element depends on wavelengths. Therefore, when the wavelength of the light projected on a specimen differs from the light (e.g., fluorescence) emitted from the specimen, problems arising from the dependence on wavelengths must be taken into account.

Because a polygon mirror can control neither the width of scanning nor the center of scanning in the direction of scanning, it cannot be used for random scanning. All such high-speed scanners cannot be controlled in a given direction of deflection, and they cannot be used for random scanning.

With the configuration of the eighth embodiment, just changing the scanner in use enables high-speed imaging and low-speed imaging or random accessing. In constructing three-dimensional images or having random access three-dimensionally, scanning can be performed along the optical axis (Z scanning) by the up-and-down movement of the stage or the objective.

Low-speed imaging and random access may be effected by a known method of scanning the stage or objective, not by the method of causing a bundle of rays to scan.

It is pointed out that the above embodiments are not restricted to the specific configurations described above, and that embodiments of the present invention may be constructed by combining lasers and scanning optical systems in various ways.

Moreover, the signals sensed by a plurality of sensors are subjected to image processing to produce special effects, as with an ordinary laser scanning microscope.

The present invention is not limited to the first to eighth embodiments and may be practiced or embodied in still other ways without departing from the spirit or essential character thereof.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A laser scanning microscope comprising:
    at least two laser light sources that output coherent light;
    at least two scanning optical systems corresponding respectively to said at least two laser light sources, each of said at least two scanning optical systems separately causing rays of the coherent light outputted from the at least two laser light sources to scan a specimen; and
    a sense optical system that senses at least one of: (i) transmitted light produced by said coherent light passing through said specimen, (ii) reflected light produced by said coherent light being reflected by said specimen, and (iii) fluorescence from said specimen, when at least one of the scanning optical systems is causing said coherent light to scan said specimen.

2. A laser scanning microscope according to claim 1, further comprising:
    an optical element that causes an optical axis of each of the rays of said coherent light caused to scan the specimen to coincide with each other; and
    an objective that is placed on said coinciding optical axis and that gathers the rays of said coherent light at a same position on said specimen.

3. A laser scanning microscope according to claim 1, further comprising:
    control means for providing scanning control with respect to each of said at least two scanning optical systems.

4. A laser scanning microscope according to claim 1, further comprising:
    image processing means for forming images from each ray of said transmitted light, each ray of said reflected light sensed by said sense optical system for each of said scanning optical systems, and from each ray of said fluorescence, and for superimposing the images on at least a same image, when said at least two scanning optical systems cause said coherent light to scan said specimen.

5. A laser scanning microscope according to any one of claims 1, 2, 3, or 4, further comprising:
    an optical adjustment mechanism that shifts along the optical axis of said coherent light a light convergence position on said specimen of at least one of the rays of said coherent light projected on said specimen by the scanning of said at least two scanning optical systems.

6. A laser scanning microscope according to claim 5, wherein said optical adjustment mechanism includes:
    a fixed lens for gathering said coherent light; and
    a movable lens that is placed so as to move freely along the optical axis of said coherent light, and that receives said coherent light gathered by said fixed lens and emits the coherent light at a given emission angle.

7. A laser scanning microscope according to claim 5, further comprising:
    a position check optical system that projects position check light on said specimen, wherein a position on said specimen at which light is projected coincides with a light convergence position on said specimen of said coherent light projected on said specimen by the scanning of at least one of said scanning optical systems.

8. A laser scanning microscope according to any one of claims 1, 2, 3 or 4, further comprising:
    a position check optical system that projects position check light on said specimen, wherein a position on said specimen at which light is projected coincides with a light convergence position on said specimen of said coherent light projected on said specimen by the scanning of at least one of said scanning optical systems.

9. A laser scanning microscope according to claim 1, wherein:
said at least two laser light sources comprise a first laser light source and a second laser light source, and
said at least two scanning optical systems comprise a first scanning optical system and a second scanning optical system corresponding respectively to said first laser light source and said second laser light source.

10. A laser scanning microscope according to claim 9 wherein:
said first scanning optical system causes said coherent light outputted from the first laser light source to scan a first side of a specimen;
said second scanning optical system causes said coherent light outputted from the second laser light source to scan a given region on a second side of said specimen opposite to said first side; and
said sense optical system senses the fluorescence from said specimen when said first scanning optical system scans the first side of said specimen, and senses at least one of the transmitted light and the fluorescence from said specimen when said second scanning optical system scans the given region on the second side of said specimen.

11. A laser scanning microscope according to claim 9, wherein:
said first scanning optical system causes said coherent light outputted from the first laser light source to scan the specimen;
said second scanning optical system causes said coherent light outputted from the second laser light source to scan a given region of said specimen;
said sense optical system senses the fluorescence from said specimen when said first scanning optical system scans said specimen, and senses at least one of the transmitted light and the reflected light from said specimen when said second scanning optical system scans the given region of said specimen; and
said laser microscope further comprises:
(i) a dichroic mirror that causes an optical axis of said coherent light from said first scanning optical system to coincide with an optical axis of said coherent light from said second scanning optical system; and
(ii) an objective that is placed on said coinciding optical axis and that gathers the rays of said coherent light on a same cross section of said specimen.

12. A laser scanning microscope according to claim 9, wherein:
said specimen is dyed with fluorescence pigment,
said first laser light source outputs coherent light including a wavelength that excites said fluorescence pigment to generate fluorescence, and
said scanning optical system projects said coherent light from said second laser light source on a given region of said specimen to cause said specimen to react.

13. A laser scanning microscope according to claim 9, wherein:
said first laser light source outputs one of visible continuous laser light and IR pulse laser light, and
said second laser light source outputs one of ultraviolet pulse laser light and IR pulse laser light.

14. A laser scanning microscope according to claim 13, wherein said IR pulse laser light is projected on a fluorescence pigment with which said specimen has been dyed, to induce two-photon absorption.

15. A laser scanning microscope according to claim 9, wherein:
said specimen is a workpiece,
said first laser light source outputs coherent light for observing said workpiece, and
said second laser light source outputs high-power coherent light for machining said workpiece.

16. A laser scanning microscope according to claim 9, wherein said first and second scanning optical systems each have a scanning mirror that scans in a direction perpendicular to each other and that deflects said coherent light in a direction perpendicular to each other.

17. A laser scanning microscope according to claim 9, further comprising:
control means for providing scanning control of said first and second scanning optical systems,
image processing means for arranging images obtained when said first and second scanning optical systems each scan said specimen, and
a monitor for displaying a result of the image processing from the image processing means.

18. A laser scanning microscope according to claim 9, further comprising an optical adjustment mechanism that shifts along an optical axis of said coherent light a light convergence position on said specimen of said coherent light projected on said specimen by the scanning of said second scanning optical system.

19. A laser scanning microscope according to claim 18, wherein said optical adjustment mechanism includes:
a fixed lens for gathering said coherent light; and
a movable lens that is placed so as to move freely along the optical axis of said coherent light, and that receives said coherent light gathered by said fixed lens and emits the coherent light at a given emission angle.

20. A laser scanning microscope according to claim 9, further comprising:
a light source for outputting position check light; and
mirror that directs the position check light onto an optical axis of said coherent light in said second scanning optical system, and projects said position check light at a same position at which said coherent light is projected on said specimen by the scanning said second scanning optical system.

21. A laser scanning microscope according to claim 20, wherein said position check light source outputs laser light having a wavelength that has no effect on said specimen.

22. A laser scanning microscope comprising:
a laser light source for outputting sub-picosecond monochromatic coherent light pulses with a wavelength in a near infrared range;
an objective system for gathering the monochromatic coherent light pulses from the laser light source on a specimen;
at least one bundle-of-rays conversion optical system for collimating a bundle of rays of monochromatic coherent light pulses outputted from said laser light source to a desired size;
optical-path branching means for at least one of: (i) branching an optical path of the monochromatic coherent light pulses from the bundle-of-rays conversion optical system into two optical paths, and (ii) switching the optical path;
a first scanning optical system that is placed on a first branch optical path via the optical-path branching means and that gathers said monochromatic coherent light pulses on an image surface in said objective system and causes said monochromatic coherent light pulses to scan the image surface;

a sense optical system for sensing fluorescence from said specimen that is excited by a light convergence spot of the gathered monochromatic coherent light;

a second scanning optical system that is placed on a second branch optical path via the optical-path branching means and that gathers said monochromatic coherent light pulses on the image surface in said objective system and causes said monochromatic light pulses to scan the image surface; and optical-path coupling means for introducing said light convergence spot into said objective system, wherein said objective system is shared by said first and second optical paths.

* * * * *